US012720316B2

(12) United States Patent
Hong

(10) Patent No.: US 12,720,316 B2
(45) Date of Patent: Aug. 25, 2026

(54) METHOD FOR DIRECT COMMUNICATION, AND USER EQUIPMENT

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 295 days.

(21) Appl. No.: 18/291,746

(22) PCT Filed: Jul. 28, 2021

(86) PCT No.: PCT/CN2021/109087

§ 371 (c)(1),
(2) Date: Jan. 24, 2024

(87) PCT Pub. No.: WO2023/004656

PCT Pub. Date: Feb. 2, 2023

(65) Prior Publication Data

US 2024/0365125 A1 Oct. 31, 2024

(51) Int. Cl.

*H04W 12/00* (2021.01)
*H04W 12/033* (2021.01)
*H04W 12/63* (2021.01)
*H04W 76/14* (2018.01)

(52) U.S. Cl.

CPC ......... *H04W 12/63* (2021.01); *H04W 12/033* (2021.01); *H04W 76/14* (2018.02)

(58) Field of Classification Search

CPC ... H04W 12/63; H04W 12/033; H04W 76/14; H04W 4/70; H04W 12/02; H04W 12/08; H04W 12/106; H04W 12/37; H04W 92/18; H04L 63/205; H04L 9/08

See application file for complete search history.

(56) References Cited

U.S. PATENT DOCUMENTS

2016/0149876 A1* 5/2016 Zhang ................ H04W 12/106 726/4
2016/0337850 A1* 11/2016 Suh ..................... H04L 63/0876
2018/0375647 A1 12/2018 Yan

FOREIGN PATENT DOCUMENTS

CN 105264816 A 1/2016
WO WO 2021027435 A1 2/2021

OTHER PUBLICATIONS

PCT/CN2021/109087, International Search Report dated Apr. 20, 2022, 2 pages.
Qualcomm Incorporated "Proposed text for security establishment clause of NR PC5 unicast security", 3GPP TSG-SA3 Meeting #98e; S3-200347, Mar. 2020, 5 pages.

(Continued)

*Primary Examiner* — Ping Y Hsieh
(74) *Attorney, Agent, or Firm* — Cozen O'Connor

(57) ABSTRACT

A method for direct communication may be performed by a user equipment (UE) receiving a proximity based service (ProSe), and includes: acquiring a security policy corresponding to the ProSe; and establishing direct communication security with a UE initiating the ProSe based on the security policy. A device for direct communication may also implement the method.

20 Claims, 19 Drawing Sheets

(56) References Cited

OTHER PUBLICATIONS

3GPP "Technical Specification Group Services and System Aspects; Study on security aspects of 3GPP support for advanced Vehicle-to-Everything (V2X) services" (Release 16) 3GPP TR 33.836 V16.1.0, Sep. 2020, 51 pages.
European Patent Application No. 21951268.8, Search and Opinion dated Jul. 19, 2024, 8 pages.
Chinese Patent Application No. 202180002265.3 Office Action with English translation dated Mar. 21, 2025, 14 pages.
3rd Generation Partnership Project; Security aspects of 3GPP support for advanced Vehicle-to-Everything (V2X) services (Release 16) 3GPP TS 33.536 V1.2.0, May 2020, 26 pages.
3rd Generation Partnership Project; Security aspects of 3GPP support for advanced Vehicle-to-Everything (V2X) services (Release 16) 3GPP TS 33.536 V0.3.0, Mar. 2020, 21 pages.

* cited by examiner

2200 apparatus for direct communication

2201 acquiring module

2202 communication module

METHOD FOR DIRECT COMMUNICATION, AND USER EQUIPMENT

CROSS-REFERENCE TO RELATED APPLICATIONS

This application is the US national phase application of International Application No. PCT/CN2021/109087, filed on Jul. 28, 2021, the entire contents of which are incorporated herein by reference.

TECHNICAL FIELD

The present disclosure relates to a field of communication technologies, and particularly to a method and an apparatus for direct communication, and a user equipment (UE).

BACKGROUND

In a 5G communication system, a proximity based service (ProSe) is introduced, to achieve direct communication between user equipments (UEs).

However, it is an urgent problem to be solved how to ensure direct communication security between the UEs in the ProSe.

SUMMARY

According to a first aspect of the disclosure, a method for direct communication is provided, and performed by a UE receiving a proximity based service (ProSe). The method includes:

- acquiring a security policy corresponding to the ProSe; and
- establishing direct communication security with a UE initiating the ProSe based on the security policy.

According to a second aspect of the disclosure, a method for direct communication is provided, and performed by a UE initiating a ProSe. The method includes:

- acquiring a security policy corresponding to the ProSe; and
- establishing direct communication security with a UE receiving the ProSe based on the security policy.

According to a third aspect of the present disclosure, a UE receiving a ProSe is provided, and includes:

- a processor; and
- a memory storing instructions executable by the processor,
- wherein the processor is configured to:
- acquire a security policy corresponding to the ProSe; and
- establish direct communication security with a UE initiating the ProSe based on the security policy.

According to a fourth aspect of the present disclosure, a UE initiating a ProSe is provided, and includes a processor and a memory storing instructions executable by the processor. The processor is configured to implement the above method for direct communication performed by the UE initiating a ProSe.

Additional aspects and advantages of embodiments of the disclosure will be given in part in the following descriptions, become apparent in part from the following descriptions, or be learned from the practice of the embodiments of the disclosure.

BRIEF DESCRIPTION OF THE DRAWINGS

The above and/or additional aspects and advantages of the present disclosure will become obvious and easy to understand from the following description of the embodiments in conjunction with the accompanying drawings.

FIG. 1 is a flowchart illustrating a method for direct communication performed by a UE receiving a ProSe according to an embodiment of the present disclosure.

DETAILED DESCRIPTION

Figure 2:
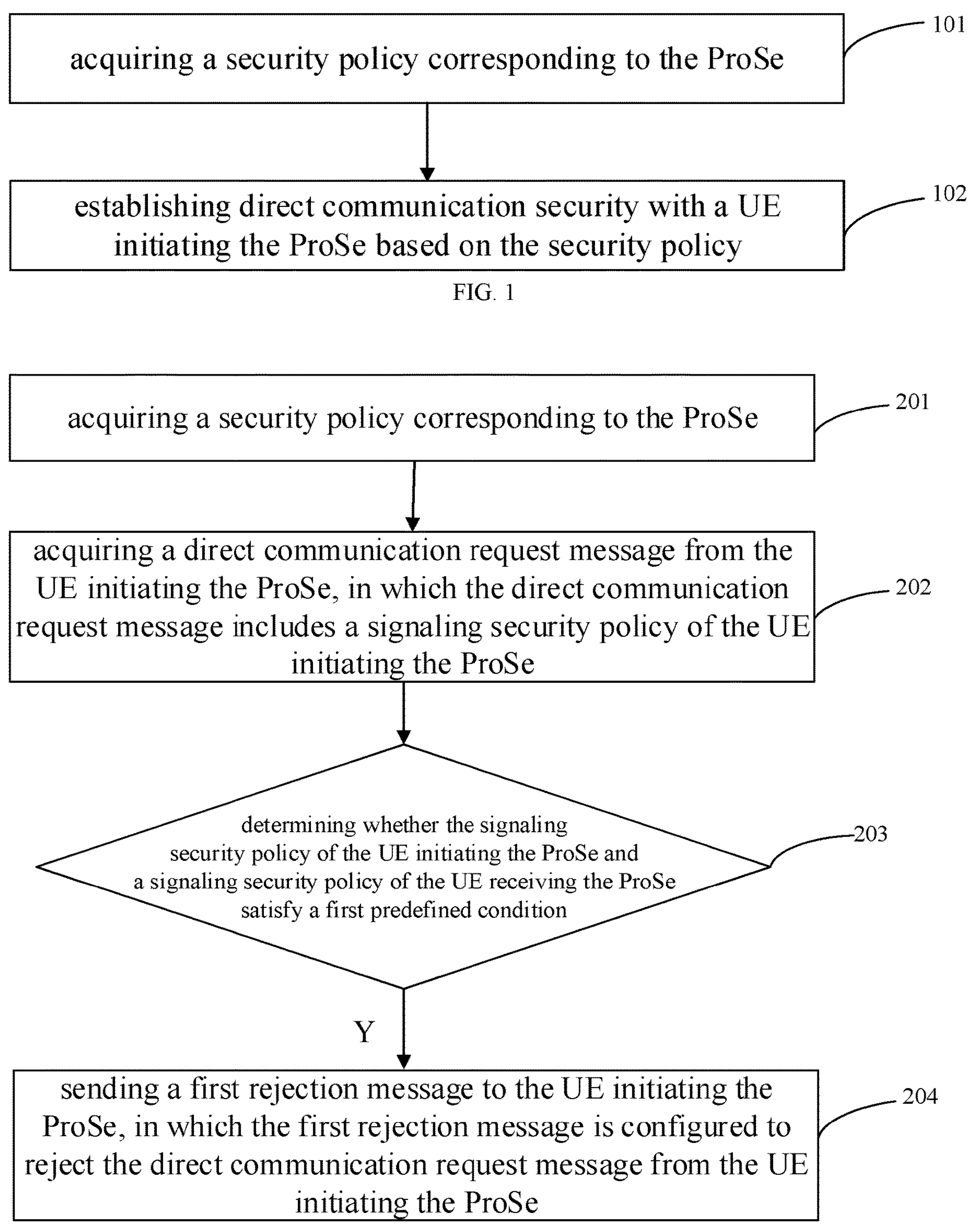
FIG. 2 is a flowchart illustrating a method for direct communication performed by a UE receiving a ProSe according to another embodiment of the present disclosure.

The example embodiments will be described in detail here, and examples thereof are shown in the accompanying drawings. When the following descriptions refer to the accompanying drawings, unless otherwise indicated, the same numbers in different drawings represent the same or similar elements. The implementations described in the following example embodiments do not represent all the implementations consistent with the present invention. Rather, they are merely examples of the apparatus and method consistent with some aspects of the present invention as detailed in the appended claims. When the following descriptions refer to the accompanying drawings, same numbers in different drawings represent same or similar elements unless otherwise indicated. The implementations described in the following exemplary embodiments do not represent all implementations consistent with embodiments of the present disclosure. Rather, they are merely examples of apparatuses and methods consistent with some aspects of the disclosure as detailed in the appended claims.

The terms described in the embodiments of the present disclosure are only for the purpose of describing specific embodiments and are not intended to limit the embodiments of the present disclosure. The singular forms “a”, “the” used in the embodiments of the disclosure and the appended claim are also intended to include plural forms, unless the context clearly indicates otherwise. It should also be understood that the term “and/or” used in the present disclosure means and includes any or all possible combinations of one or more associated listed items.

It should be understood that, although the terms first, second, third, etc. may be used in embodiments of the present disclosure to describe various information, such information shall not be limited to these terms. These terms are only used to distinguish the same category of information. For example, subject to the scope of embodiments of the present disclosure, first information may also be referred to as second information, and similarly, second information may also be referred to as first information. It depends on the context. For example, the word “in case of” and “if” as used herein may be interpreted as “in a case that” or “when” or “in response to determining”.

The embodiments of the present disclosure are described below. Examples of the embodiments are shown in the accompanying drawing, in which the constant same or similar labels indicate the same or similar elements. The embodiments described herein with reference to drawings are explanatory, serve to explain the disclosure, and are not construed to limit embodiments of the disclosure.

In the method for the direct communication provided in embodiments of the disclosure, the UE receiving the ProSe can acquire the security policy corresponding to the ProSe, and establish direct communication security with the UE initiating the ProSe based on the acquired security policy. Therefore, in embodiments of the disclosure, the security policy corresponding to the ProSe can be configured for the UE, so that the UE receiving the ProSe and the UE initiating the ProSe can establish direct communication security based on the security policy. Therefore, the direct communication security between the UEs in the ProSe is guaranteed, thereby improving security of information transmission.

The method and the apparatus for direct communication, the user equipment (UE) and the storage medium provided in the present disclosure are described referring to attached drawings.

FIG. 1 is a flowchart illustrating a method for direct communication according to an embodiment of the present disclosure. As illustrated in FIG. 1, the method for direct communication is performed by a UE receiving a ProSe, and may include following steps.

At step 101, a security policy corresponding to the ProSe is acquired.

It needs to be noted that an indication method in embodiments of the present disclosure may be performed by any UE. The UE may refer to a device that provides voice and/or data connectivity for a user. The UE may communicate with one or more core networks via a radio access network (RAN). The UE may be an internet of things (IoT) terminal such as a sensor device and a mobile phone (or referred to as a cellular phone), and a computer having an IoT terminal such as a fixed, portable, compact, handheld, computer built-in or onboard apparatus. For example, a station (STA), a subscriber unit, a subscriber station, a mobile station, a mobile, a remote station, an access point, a remote terminal, an access terminal, a user terminal or a user agent. Alternatively, the UE may be a device of an unmanned aerial vehicle (UAV). Alternatively, the UE may be an onboard device, and for example, may be a vehicle computer with a wireless communication function, or a wireless terminal externally connected to a vehicle computer. Alternatively, the UE may be a roadside device, and for example, may be a street lamp, a signal lamp or other roadside device with a wireless communication function.

In an embodiment of the disclosure, the security policy corresponding to the ProSe may be configured for each ProSe UE, so that the ProSe UE may secure a PC5 interface of the ProSe UE based on the security policy.

In an embodiment of the disclosure, the security policy corresponding to the ProSe may specifically include a REQUIRED ProSe and a security policy corresponding to the REQUIRED ProSe.

In an embodiment of the present disclosure, the security policy may specifically include at least one of:

a signaling integrity protection policy;

a signaling encryption protection policy;

a UP integrity protection policy; or a UP encryption protection policy.

In an embodiment of the present disclosure, the security policy may include any one of the above policies. In another embodiment of the present disclosure, the security policy may include any combination of the above policies.

In an embodiment of the present disclosure, the signaling integrity protection policy and the signaling encryption protection policy belong to the signaling security policy; and the UP integrity protection policy and the UP encryption protection policy belong to the UP security policy.

Further, in an embodiment of the disclosure, the security policy may include REQUIRED, NOT NEEDED and PREFERRED.

Specifically, in an embodiment of the disclosure, the signaling integrity protection policy may include REQUIRED, or NOT NEEDED, or PREFERRED.

In an embodiment of the disclosure, the signaling encryption protection policy may include REQUIRED, or NOT NEEDED, or PREFERRED.

In an embodiment of the disclosure, the UP integrity protection policy may include REQUIRED, or NOT NEEDED, or PREFERRED.

In an embodiment of the disclosure, the UP encryption protection policy may include REQUIRED, or NOT NEEDED, or PREFERRED.

It needs to be noted that, in an embodiment of the disclosure, REQUIRED may indicate that the ProSe UE needs security protection. And, in an embodiment of the disclosure, when the security policy corresponding to the ProSe UE is REQUIRED, the ProSe UE may only establish a secure connection with the ProSe UE with the security policy being REQUIRED. Further, for example, when the security policy corresponding to the ProSe UE is REQUIRED, the ProSe UE may only establish a connection with the ProSe UE using a non-NULL confidentiality algorithm or an integrity algorithm.

In an embodiment of the disclosure, NOT NEEDED may indicate that the ProSe UE does not need security protection. In an embodiment of the disclosure, when the security policy corresponding to the ProSe UE is NOT NEEDED, the ProSe UE may only establish an insecure connection with the ProSe UE with the security policy being NOT NEEDED.

In an embodiment of the disclosure, PREFERRED indicates that the ProSe UE may perform a security protection or may not perform a security protection. In an embodiment of the disclosure, when the security policy corresponding to the ProSe UE is PREFERRED, the ProSe UE may establish a secure connection with the ProSe UE with the security policy being REQUIRED or may establish an insecure connection with the ProSe UE with the security policy being NOT NEEDED.

It needs to be noted that, in an embodiment of the disclosure, there is a security policy conflict between the ProSe UE with the security policy being REQUIRED and the ProSe UE with the security policy being NOT NEEDED, so that the two ProSe UEs are not qualified for direct connection.

Further, in an embodiment of the disclosure, the method for acquiring by the ProSe UE the security policy corresponding to the ProSe may include: acquiring a REQUIRED ProSe sent from a policy control function (PCF) and a security policy corresponding to the REQUIRED ProSe.

In another embodiment of the disclosure, the method for acquiring by the ProSe UE the security policy corresponding to the ProSe may include: acquiring a REQUIRED ProSe from the ProSe application server and a security policy corresponding to the REQUIRED ProSe. In an embodiment of the disclosure, the ProSe application server may send a security policy corresponding to the ProSe service to the ProSe UE via the PCF. In another embodiment of the disclosure, the ProSe application server may send a security policy corresponding to the ProSe to the ProSe UE via a PC1 interface.

In another embodiment of the disclosure, the method for acquiring by the ProSe UE the security policy corresponding to the ProSe may include: acquiring a REQUIRED ProSe configured on a universal integrated circuit card (UICC) and a security policy corresponding to the REQUIRED ProSe.

It needs to be noted that, in an embodiment of the disclosure, when the ProSe UE acquires the security policy corresponding to the ProSe, the security policy may perform security protection via a non access stratum (NAS) signaling. In an embodiment of the disclosure, the NAS security may be established after the ProSe UE registers the ProSe.

At step 102, direct communication is established with a UE initiating the ProSe based on the security policy.

The method for establishing the direct communication with the UE initiating the ProSe based on the security policy is introduced in subsequent embodiments.

In summary, in the method for direct communication provided in the embodiments of the disclosure, the UE receiving the ProSe can acquire the security policy corresponding to the ProSe, and establish direct communication security with the UE initiating the ProSe based on the acquired security policy. Therefore, in the embodiments of the disclosure, the security policy corresponding to the ProSe can be configured for the UE, so that the UE receiving the ProSe and the UE initiating the ProSe can establish the direct communication security based on the security policy. Therefore, the direct communication security between the UEs in the ProSe is guaranteed, thereby improving security of information transmission.

FIG. 2 is a flowchart illustrating a method for direct communication according to another embodiment of the present disclosure. As illustrated in FIG. 2, the method for direct communication is performed by a UE receiving a ProSe, and may include following steps.

At step 201, a security policy corresponding to the ProSe is acquired.

The descriptions of step 201 may to refer to related introduction of the above embodiments, which will not be repeated here.

At step 202, a direct communication request message sent from the UE initiating the ProSe is acquired. The direct communication request message includes a signaling security policy of the UE initiating the ProSe.

At step 203, whether the signaling security policy of the UE initiating the ProSe and a signaling security policy of the UE receiving the ProSe satisfy a first predefined condition is determined.

In an embodiment of the present disclosure, the first predefined condition may include at least one of:

- a signaling integrity protection policy of the UE initiating the ProSe being NOT NEEDED, and a signaling integrity protection policy of the UE receiving the ProSe being REQUIRED;
- a signaling encryption protection policy of the UE initiating the ProSe being NOT NEEDED, and a signaling encryption protection policy of the UE receiving the ProSe being REQUIRED;
- a signaling integrity protection policy of the UE initiating the ProSe being REQUIRED, and a signaling integrity protection policy of the UE receiving the ProSe being NOT NEEDED; or
- a signaling encryption protection policy of the UE initiating the ProSe being REQUIRED, and a signaling encryption protection policy of the UE receiving the ProSe being NOT NEEDED.

It needs to be noted that, in an embodiment of the present disclosure, the first predefined condition may be only any one of the above predefined conditions. In another embodiment of the present disclosure, the first predefined condition may include any combination of the above predefined conditions. In an embodiment of the disclosure, when the first predefined condition includes the two or more predefined conditions, if the signaling security policy of the UE initiating the ProSe and the signaling security policy of the UE receiving the ProSe satisfy any one of the first predefined condition, it is determined that the signaling security policy of the UE initiating the ProSe and the signaling security policy of the UE receiving the ProSe satisfy the first predefined condition, and if not, it is determined that the signaling security policy of the UE initiating the ProSe and the signaling security policy of the UE receiving the ProSe do not satisfy the first predefined condition.

In an embodiment of the disclosure, when it is determined that the signaling security policy of the UE initiating the ProSe and the signaling security policy of the UE receiving the ProSe do satisfy the first predefined condition, it indicates that there is a security policy conflict between the UE initiating the ProSe and the UE receiving the ProSe, and both are not qualified for direct communication, and step 204 continues to be executed.

At step 204, a first rejection message is sent to the UE initiating the ProSe. The first rejection message is configured to reject the direct communication request message sent from the UE initiating the ProSe.

In summary, in the method for direct communication provided in the embodiments of the disclosure, the UE receiving the ProSe can acquire the security policy corresponding to the ProSe, and establish direct communication security with the UE initiating the ProSe based on the acquired security policy. Therefore, in the embodiments of the disclosure, the security policy corresponding to the ProSe can be configured for the UE, so that the UE receiving the ProSe and the UE initiating the ProSe can establish direct communication security based on the security policy. Therefore, the direct communication security between UEs in a ProSe is guaranteed, thereby improving security of information transmission.

Figure 3:
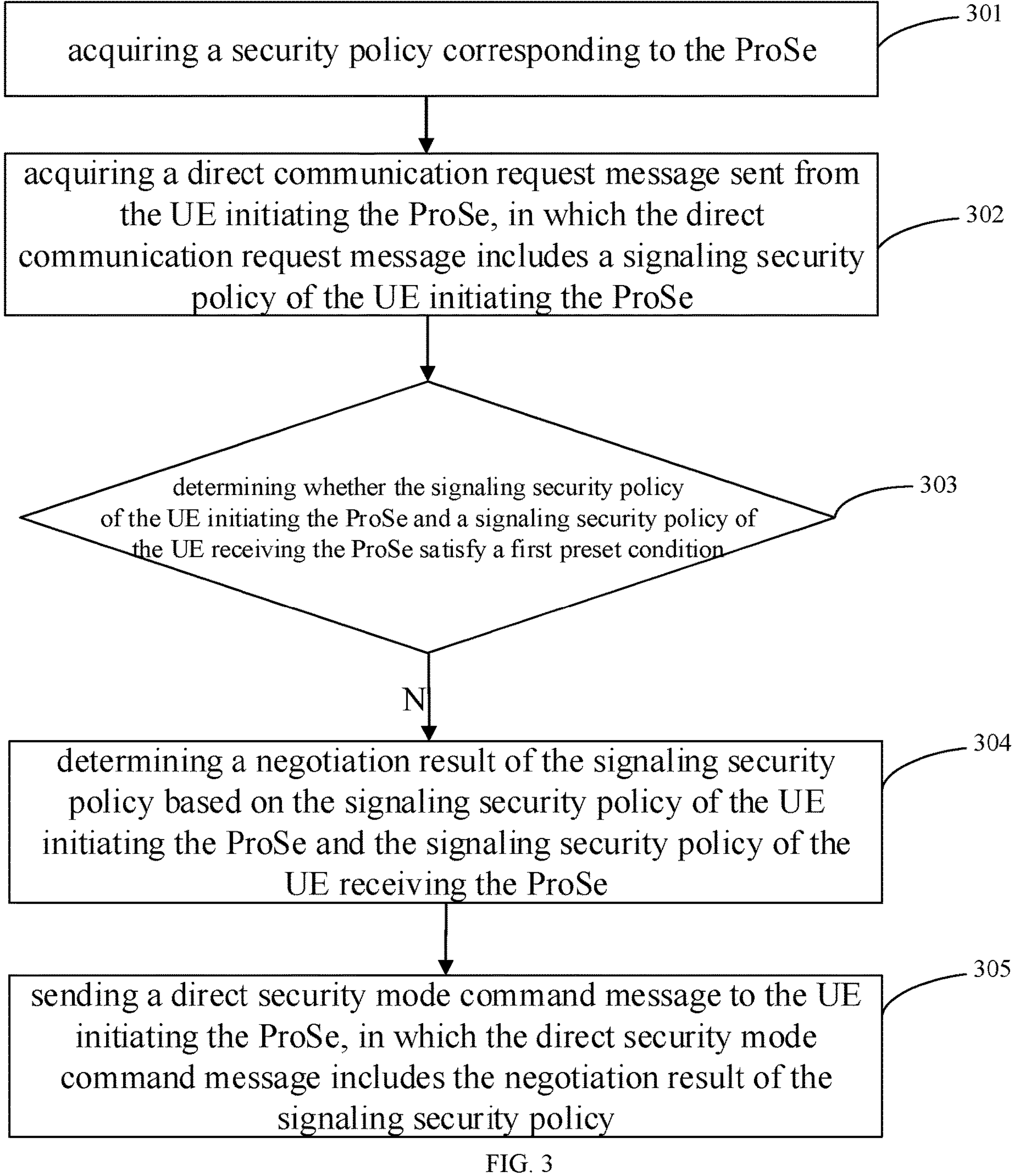
FIG. 3 is a flowchart illustrating a method for direct communication performed by a UE receiving a ProSe according to another embodiment of the present disclosure.

FIG. 3 is a flowchart illustrating a method for direct communication according to another embodiment of the present disclosure. As illustrated in FIG. 3, the method for direct communication is performed by a UE receiving a ProSe, and may include following steps.

At step 301, a security policy corresponding to the ProSe is acquired.

At step 302, a direct communication request message sent from the UE initiating the ProSe is acquired. The direct communication request message includes a signaling security policy of the UE initiating the ProSe.

At step 303, whether the signaling security policy of the UE initiating the ProSe and a signaling security policy of the UE receiving the ProSe satisfy a first predefined condition is determined.

The descriptions of steps 301 to 303 may to refer to related introduction of the above embodiments, which will not be repeated here.

In an embodiment of the disclosure, when it is determined that the signaling security policy of the UE initiating the ProSe and the signaling security policy of the UE receiving the ProSe do not satisfy the first predefined condition, it indicates that there is no security policy conflict between the UE initiating the ProSe and the UE receiving the ProSe, and both are qualified for direct communication, and step 304 continues to be executed.

At step 304, a negotiation result of the signaling security policy is determined based on the signaling security policy of the UE initiating the ProSe and the signaling security policy of the UE receiving the ProSe.

In an embodiment of the present disclosure, the negotiation result of the signaling security policy may include at least one of:

- a negotiation result of the signaling integrity protection policy; or
- a negotiation result of the signaling encryption protection policy.

In an embodiment of the disclosure, determining the negotiation result of the signaling security policy based on the signaling security policy of the UE initiating the ProSe and the signaling security policy of the UE receiving the ProSe, includes:

When the signaling integrity protection policy of the UE initiating the ProSe is NOT NEEDED, and/or and the signaling integrity protection policy of the UE receiving the ProSe is NOT NEEDED, it is determined that the negotiation result of the signaling integrity protection policy is NOT NEEDED. That is, if there is no security policy conflict between the UE receiving the ProSe and the UE initiating the ProSe, when the signaling integrity protection policy of one ProSe UE of the UE initiating the ProSe and the UE receiving the ProSe is NOT NEEDED, it is determined that the negotiation result of the signaling integrity protection policy is NOT NEEDED.

When the signaling integrity protection policy of the UE initiating the ProSe is REQUIRED, and/or the signaling integrity protection policy of the UE receiving the ProSe is REQUIRED, it is determined that the negotiation result of the signaling integrity protection policy is REQUIRED. That is, if there is no security policy conflict between the UE receiving the ProSe and the UE initiating the ProSe, when the signaling integrity protection policy of one ProSe UE of the UE initiating the ProSe and the UE receiving the ProSe is REQUIRED, it is determined that the negotiation result of the signaling integrity protection policy is REQUIRED.

When the signaling integrity protection policy of the UE initiating the ProSe is PREFERRED, and the signaling integrity protection policy of the UE receiving the ProSe is PREFERRED, it is determined that the negotiation result of the signaling integrity protection policy is REQUIRED or NOT NEEDED.

When the signaling encryption protection policy of the UE initiating the ProSe is NOT NEEDED, and/or the signaling encryption protection policy of the UE receiving the ProSe is NOT NEEDED, it is determined that the negotiation result of the signaling encryption protection policy is NOT NEEDED. That is, if there is no security policy conflict between the UE receiving the ProSe and the UE initiating the ProSe, when the signaling encryption protection policy of one ProSe UE of the UE initiating the ProSe and the UE receiving the ProSe is NOT NEEDED, it is determined that the negotiation result of the signaling encryption protection policy is NOT NEEDED.

When the signaling encryption protection policy of the UE initiating the ProSe is REQUIRED, and/or the signaling encryption protection policy of the UE receiving the ProSe is REQUIRED, it is determined that the negotiation result of the signaling encryption protection policy is REQUIRED. That is, if there is no security policy conflict between the UE receiving the ProSe and the UE initiating the ProSe, when the signaling encryption protection policy of one ProSe UE of the UE initiating the ProSe and the UE receiving the ProSe is REQUIRED, it is determined that the negotiation result of the signaling encryption protection policy is REQUIRED.

When the signaling encryption protection policy of the UE initiating the ProSe is PREFERRED, and the signaling encryption protection policy of the UE receiving the ProSe is PREFERRED, it is determined that the negotiation result of the signaling encryption protection policy is REQUIRED or NOT NEEDED.

At step 305, a direct security mode command message is sent to the UE initiating the ProSe. The direct security mode command message includes the negotiation result of the signaling security policy.

In an embodiment of the present disclosure, the negotiation result of the signaling security policy included in the direct security mode command message may be the negotiation result determined at step 304.

In summary, in the method for direct communication provided in the embodiments of the disclosure, the UE receiving the ProSe can acquire the security policy corresponding to the ProSe, and establish direct communication security with the UE initiating the ProSe based on the acquired security policy. Therefore, in the embodiments of the disclosure, the security policy corresponding to the ProSe can be configured for the UE, so that the UE receiving the ProSe and the UE initiating the ProSe can establish direct communication security based on the security policy. Therefore, the direct communication security between the UEs in the ProSe is guaranteed, thereby improving security of information transmission.

Figure 4:
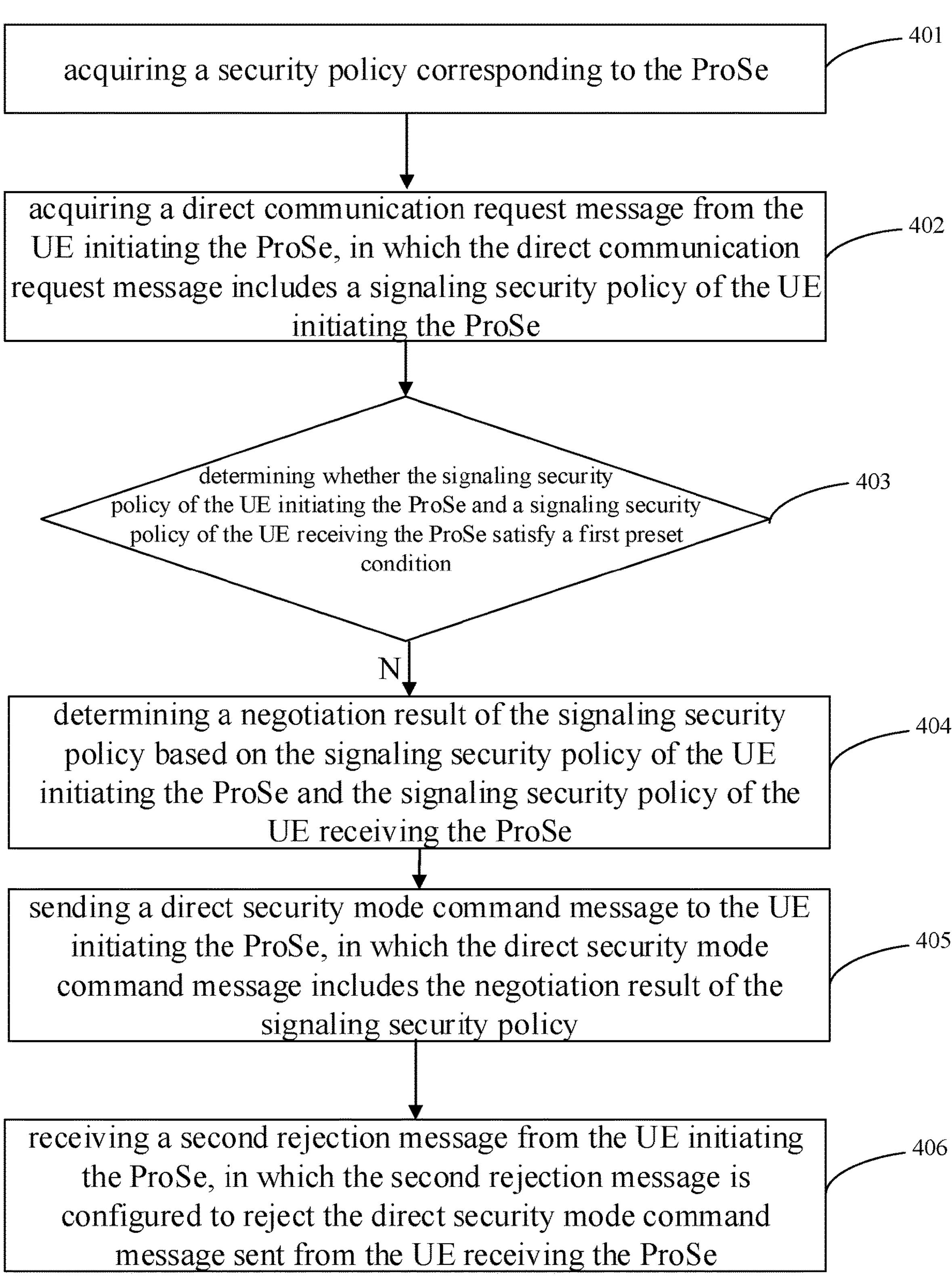
FIG. 4 is a flowchart illustrating a method for direct communication performed by a UE receiving a ProSe according to another embodiment of the present disclosure.

FIG. 4 is a flowchart illustrating a method for direct communication according to another embodiment of the present disclosure. As illustrated in FIG. 4, the method for direct communication is performed by a UE receiving a ProSe, and may include following steps.

At step 401, a security policy corresponding to the ProSe is acquired.

At step 402, a direct communication request message sent from the UE initiating the ProSe is acquired. The direct communication request message includes a signaling security policy of the UE initiating the ProSe.

At step 403, whether the signaling security policy of the UE initiating the ProSe and a signaling security policy of the UE receiving the ProSe satisfy a first predefined condition is determined.

In an embodiment of the disclosure, when it is determined that the signaling security policy of the UE initiating the ProSe and the signaling security policy of the UE receiving the ProSe do not satisfy the first predefined condition, it indicates that there is no security policy conflict between the UE initiating the ProSe and the UE receiving the ProSe, and both are qualified for direct communication, and step 404 continues to be executed.

At step 404, a negotiation result of the signaling security policy is determined based on the signaling security policy of the UE initiating the ProSe and the signaling security policy of the UE receiving the ProSe.

At step 405, a direct security mode command message is sent to the UE initiating the ProSe. The direct security mode command message includes the negotiation result of the signaling security policy.

The descriptions of steps 401 to 405 may to refer to related introduction of the above embodiments, which will not be repeated here.

At step 406, a second rejection message sent from the UE initiating the ProSe is received. The second rejection message is configured to reject the direct security mode command message sent from the UE receiving the ProSe.

In an embodiment of the disclosure, when the UE initiating the ProSe receives the direct security mode command message sent from the UE receiving the ProSe, whether a security algorithm corresponding to the negotiation result of the signaling security policy included in the direct security mode command message is consistent with a security algorithm corresponding to the signaling security policy of the UE initiating the ProSe is determined. In an embodiment of the disclosure, when the UE initiating the ProSe determines that the security algorithm corresponding to the negotiation result of the signaling security policy included in the direct security mode command message is inconsistent with the security algorithm corresponding to the signaling security policy of the UE itself, it indicates that the UE receiving the ProSe and the UE initiating the ProSe are not qualified for direct communication, in which case, the UE initiating the ProSe sends a second rejection message to the UE receiving the ProSe, to reject the direct security mode command message sent from the the UE receiving the ProSe.

In summary, in the method for direct communication provided in the embodiments of the disclosure, the UE receiving the ProSe can acquire the security policy corresponding to the ProSe, and establish direct communication security with the UE initiating the ProSe based on the acquired security policy. Therefore, in the embodiments of the disclosure, the security policy corresponding to the ProSe can be configured for the UE, so that the UE receiving the ProSe and the UE initiating the ProSe can establish direct communication security based on the security policy. Therefore, the direct communication security between the UEs in the ProSe is guaranteed, thereby improving security of information transmission.

Figure 5:
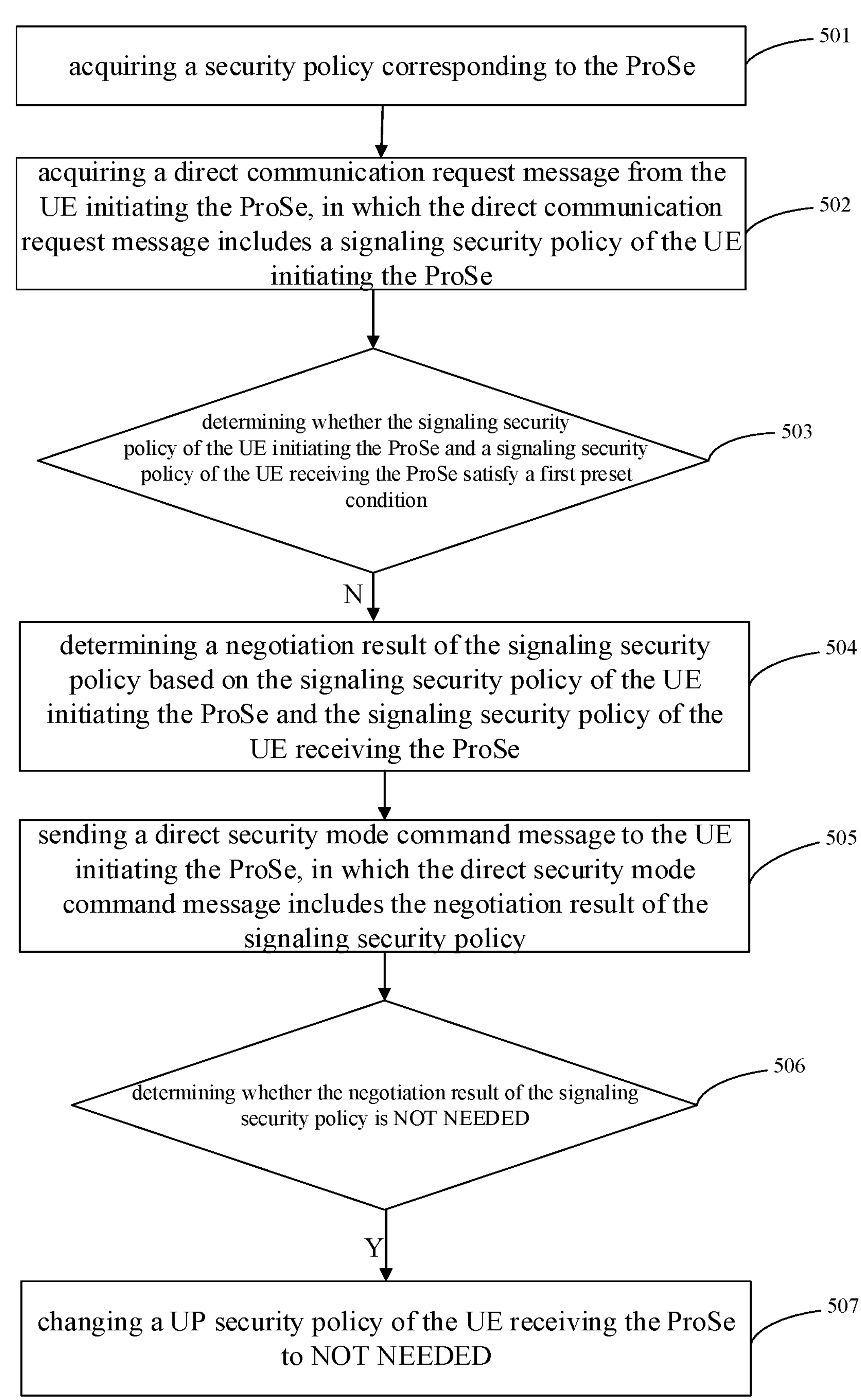
FIG. 5 is a flowchart illustrating a method for direct communication performed by a UE receiving a ProSe according to another embodiment of the present disclosure.

FIG. 5 is a flowchart illustrating a method for direct communication according to another embodiment of the present disclosure. As illustrated in FIG. 5, the method for direct communication is performed by a UE receiving a ProSe, and may include following steps.

At step 501, a security policy corresponding to the ProSe is acquired.

At step 502, a direct communication request message is acquired from the UE initiating the ProSe. The direct communication request message includes a signaling security policy of the UE initiating the ProSe.

At step 503, whether the signaling security policy of the UE initiating the ProSe and a signaling security policy of the UE receiving the ProSe satisfy a first predefined condition is determined.

In an embodiment of the disclosure, when it is determined that the signaling security policy of the UE initiating the ProSe and the signaling security policy of the UE receiving the ProSe do not satisfy the first predefined condition, it indicates that there is no security policy conflict between the UE initiating the ProSe and the UE receiving the ProSe, and both are qualified for direct communication, and step 504 continues to be executed.

At step 504, a negotiation result of the signaling security policy is determined based on the signaling security policy of the UE initiating the ProSe and the signaling security policy of the UE receiving the ProSe.

At step 505, a direct security mode command message is sent to the UE initiating the ProSe. The direct security mode command message includes the negotiation result of the signaling security policy.

The descriptions of steps 501 to 505 may to refer to related introduction of the above embodiments, which will not be repeated here.

At step 506, it is determined whether the negotiation result of the signaling security policy is NOT NEEDED.

In an embodiment of the present disclosure, when the negotiation result of the signaling security policy is NOT NEEDED, step 507 continues to be executed.

At step 507, a UP security policy of the UE receiving the ProSe is changed to NOT NEEDED.

In an embodiment of the disclosure, when the negotiation result of the signaling encryption protection policy is NOT NEEDED, it indicates that the signaling between the UE initiating the ProSe and the UE receiving the ProSe does not need a security protection and the negotiated encryption algorithm is a NULL algorithm, in which case, the UP encryption protection policy of the UE receiving the ProSe is changed to NOT NEEDED.

In summary, in the method for direct communication provided in the embodiments of the disclosure, the UE receiving the ProSe can acquire the security policy corresponding to the ProSe, and establish direct communication security with the UE initiating the ProSe based on the acquired security policy. Therefore, in the embodiments of the disclosure, the security policy corresponding to the ProSe can be configured for the UE, so that the UE receiving the ProSe and the UE initiating the ProSe can establish direct communication security based on the security policy. Therefore, the direct communication security between UEs in a ProSe is guaranteed, thereby improving security of information transmission.

Figure 6:
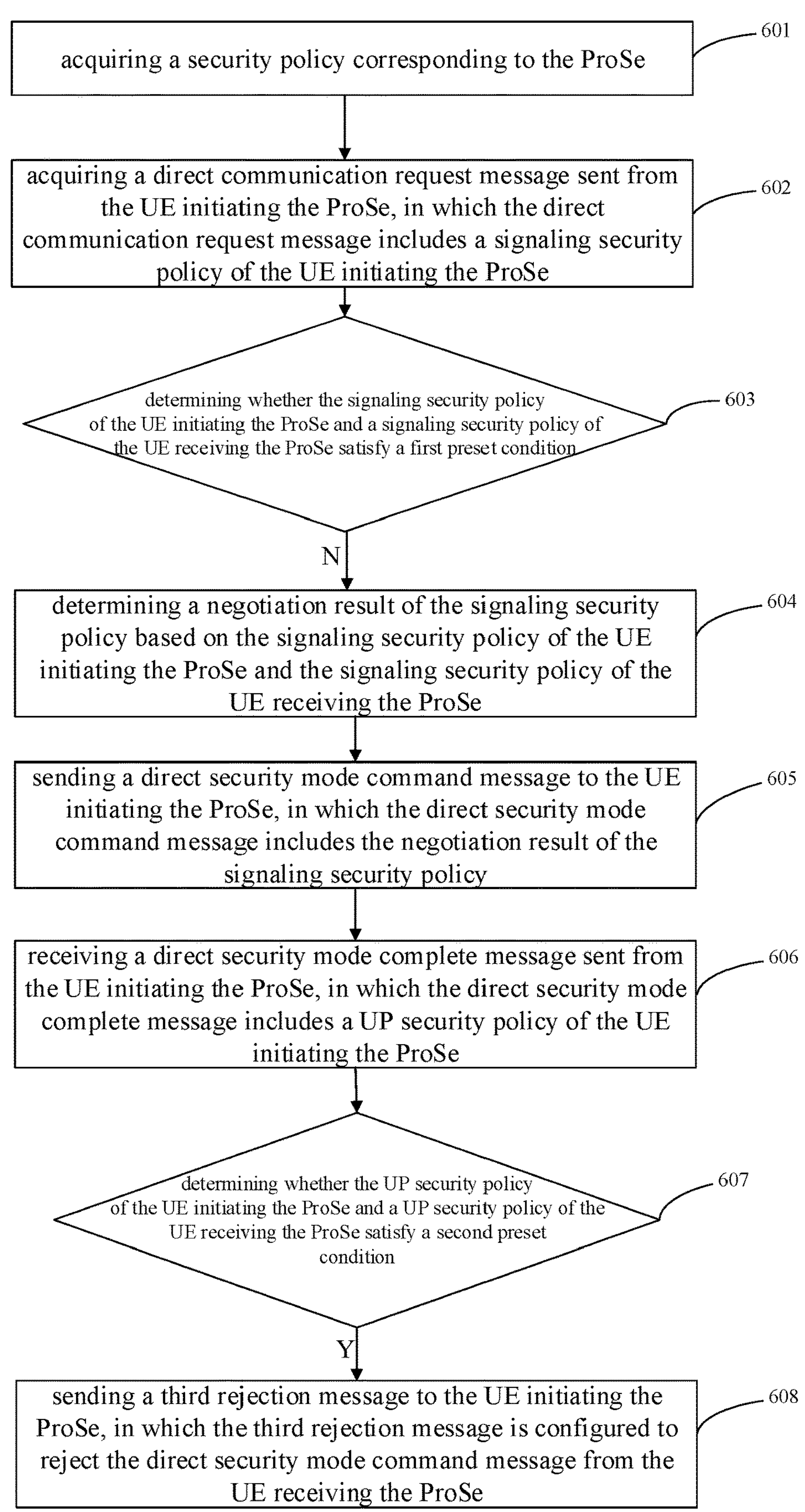
FIG. 6 is a flowchart illustrating a method for direct communication performed by a UE receiving a ProSe according to another embodiment of the present disclosure.

FIG. 6 is a flowchart illustrating a method for direct communication according to another embodiment of the present disclosure. As illustrated in FIG. 6, the method for direct communication is performed by a UE receiving a ProSe, and may include following steps.

At step 601, a security policy corresponding to the ProSe is acquired.

At step 602, a direct communication request message sent from the UE initiating the ProSe is acquired. The direct communication request message includes a signaling security policy of the UE initiating the ProSe.

At step 603, whether the signaling security policy of the UE initiating the ProSe and a signaling security policy of the UE receiving the ProSe satisfy a first predefined condition is determined.

In an embodiment of the disclosure, when it is determined that the signaling security policy of the UE initiating the ProSe and the signaling security policy of the UE receiving the ProSe do not satisfy the first predefined condition, it indicates that there is no security policy conflict between the UE initiating the ProSe and the UE receiving the ProSe, and both are qualified for direct communication, and step 604 continues to be executed.

At step 604, a negotiation result of the signaling security policy is determined based on the signaling security policy of the UE initiating the ProSe and the signaling security policy of the UE receiving the ProSe.

At step 605, a direct security mode command message is sent to the UE initiating the ProSe. The direct security mode command message includes the negotiation result of the signaling security policy.

The descriptions of steps 601 to 605 may to refer to related introduction of the above embodiments, which will not be repeated here.

In an embodiment of the disclosure, at step 605, a signaling security policy negotiation between the UE receiving the ProSe and the UE initiating the ProSe is completed, and further subsequent steps may continue to be executed to negotiate a UP security policy between the UE receiving the ProSe and the UE initiating the ProSe.

It needs to be noted that, in an embodiment of the disclosure, if the negotiation result of the signaling security policy determined at step 604 is REQUIRED, it is deemed that a signaling security protection is established between the UE receiving the ProSe and the UE initiating the ProSe, and in a subsequent process, when the UE receiving the ProSe and the UE initiating the ProSe perform an interaction, the interaction message will be subject to the signaling security protection, which ensures security of signaling transmission.

At step 606, a direct security mode complete message sent from the UE initiating the ProSe is received. The direct security mode complete message includes a UP security policy of the UE initiating the ProSe.

At step 607, it is determined whether the UP security policy of the UE initiating the ProSe and a UP security policy of the UE receiving the ProSe satisfy a second predefined condition.

In an embodiment of the present disclosure, the second predefined condition may include at least one of:

a UP integrity protection policy of the UE initiating the ProSe being NOT NEEDED, and a UP integrity protection policy of the UE receiving the ProSe being REQUIRED;

a UP encryption protection policy of the UE initiating the ProSe being NOT NEEDED, and a UP encryption protection policy of the UE receiving the ProSe being REQUIRED;

a UP integrity protection policy of the UE initiating the ProSe being REQUIRED, and a UP integrity protection policy of the UE receiving the ProSe being NOT NEEDED; or a UP encryption protection policy of the UE initiating the ProSe being REQUIRED, and a UP encryption protection policy of the UE receiving the ProSe being NOT NEEDED.

It needs to be noted that, in an embodiment of the present disclosure, the second predefined condition may include any one of the above predefined conditions. In another embodiment of the present disclosure, the second predefined condition may include any combination of the above predefined conditions. In an embodiment of the disclosure, when the second predefined condition includes the two or more predefined conditions, if the UP security policy of the UE initiating the ProSe and the UP security policy of the UE receiving the ProSe satisfy any one of the second predefined condition, it is determined that the UP security policy of the UE initiating the ProSe and the UP security policy of the UE receiving the ProSe satisfy the second predefined condition, and if not, it is determined that the UP security policy of the UE initiating the ProSe and the UP security policy of the UE receiving the ProSe do not satisfy the second predefined condition.

Further, in an embodiment of the disclosure, when it is determined that the UP security policy of the UE initiating the ProSe and a signaling security policy of the UE receiving the ProSe satisfy a second predefined condition, it indicates that there is a security policy conflict between the UE initiating the ProSe and the UE receiving the ProSe, and both are not qualified for direct communication, and step 608 continues to be executed.

In addition, it needs to be noted that, in an embodiment of the disclosure, before it is determined whether the UP security policy of the UE initiating the ProSe and a UP security policy of the UE receiving the ProSe satisfy the second predefined condition at step 607, the UE receiving the ProSe may determine whether the negotiation result of the signaling security policy determined at step 605 is NOT NEEDED, and if so, the UP security policy of the UE receiving the ProSe may be changed to NOT NEEDED. And determining whether the UP security policy of the UE initiating the ProSe and the UP security policy of the UE receiving the ProSe satisfy the second predefined condition specifically includes: determining whether the UP security policy of the UE initiating the ProSe and the changed UP security policy of the UE receiving the ProSe satisfy the second predefined condition.

At step 608, a third rejection message is sent to the UE initiating the ProSe. The third rejection message is configured to reject the direct security mode command message sent from the UE receiving the ProSe.

In summary, in the method for direct communication provided in the embodiments of the disclosure, the UE receiving the ProSe can acquire the security policy corresponding to the ProSe, and establish direct communication security with the UE initiating the ProSe based on the acquired security policy. Therefore, in the embodiments of the disclosure, the security policy corresponding to the ProSe can be configured for the UE, so that the UE receiving the ProSe and the UE initiating the ProSe can establish direct communication security based on the security policy. Therefore, the direct communication security between the UEs in the ProSe is guaranteed, thereby improving security of information transmission.

Figure 7:
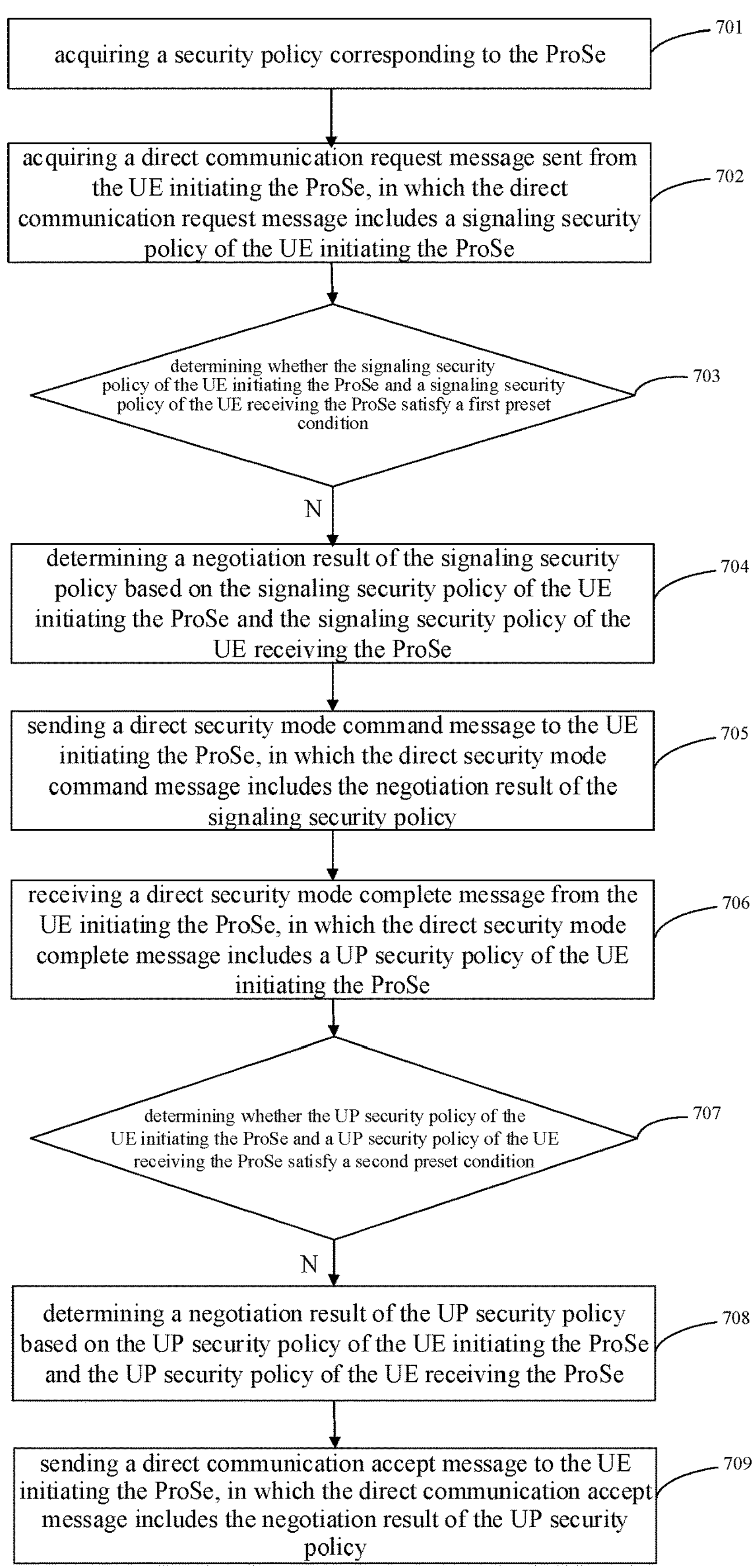
FIG. 7 is a flowchart illustrating a method for direct communication performed by a UE receiving a ProSe according to another embodiment of the present disclosure.

FIG. 7 is a flowchart illustrating a method for direct communication according to another embodiment of the present disclosure. As illustrated in FIG. 7, the method for direct communication is performed by a UE receiving a ProSe, and may include following steps.

At step 701, a security policy corresponding to the ProSe is acquired.

At step 702, a direct communication request message sent from the UE initiating the ProSe is acquired. The direct communication request message includes a signaling security policy of the UE initiating the ProSe.

At step 703, whether the signaling security policy of the UE initiating the ProSe and a signaling security policy of the UE receiving the ProSe satisfy a first predefined condition is determined.

In an embodiment of the disclosure, when it is determined that the signaling security policy of the UE initiating the ProSe and the signaling security policy of the UE receiving the ProSe do not satisfy the first predefined condition, it indicates that there is no security policy conflict between the UE initiating the ProSe and the UE receiving the ProSe, and both are qualified for direct communication, and step 704 continues to be executed.

At step 704, a negotiation result of the signaling security policy is determined based on the signaling security policy of the UE initiating the ProSe and the signaling security policy of the UE receiving the ProSe.

At step 705, a direct security mode command message is sent to the UE initiating the ProSe. The direct security mode command message includes the negotiation result of the signaling security policy.

At step 706, a direct security mode complete message sent from the UE initiating the ProSe is received. The direct security mode complete message includes a UP security policy of the UE initiating the ProSe.

At step 707, it is determined whether the UP security policy of the UE initiating the ProSe and a UP security policy of the UE receiving the ProSe satisfy a second predefined condition.

The descriptions of steps 701 to 707 may to refer to related introduction of the above embodiments, which will not be repeated here.

In an embodiment of the disclosure, when determining that the signaling security policy of the UE initiating the ProSe and the signaling security policy of the UE receiving the ProSe do not satisfy the second predefined condition, it indicates that there is no security policy conflict between the UE initiating the ProSe and the UE receiving the ProSe, and both are qualified for direct communication, and step 708 continues to be executed.

In addition, it needs to be noted that, in an embodiment of the disclosure, before it is determined whether the UP security policy of the UE initiating the ProSe and the signaling security policy of the UE receiving the ProSe satisfy the second predefined condition at step 707, the UE receiving the ProSe may determine whether the negotiation result of the signaling security policy determined at step 705 is NOT NEEDED, and if so, the UP security policy of the UE receiving the ProSe may be changed to NOT NEEDED. And determining whether the UP security policy of the UE initiating the ProSe and the UP security policy of the UE receiving the ProSe satisfy the second predefined condition specifically includes: determining whether the UP security policy of the UE initiating the ProSe and the changed UP security policy of the UE receiving the ProSe satisfy the second predefined condition.

At step 708, a negotiation result of the UP security policy is determined based on the UP security policy of the UE initiating the ProSe and the UP security policy of the UE receiving the ProSe.

In an embodiment of the present disclosure, the negotiation result of the UP security policy may include at least one of:

a negotiation result of the UP integrity protection policy; or a negotiation result of the UP encryption protection policy.

In an embodiment of the disclosure, determining the negotiation result of the UP security policy based on the UP security policy of the UE initiating the ProSe and the UP security policy of the UE receiving the ProSe includes the followings.

When the UP integrity protection policy of the UE initiating the ProSe is NOT NEEDED, and/or the UP integrity protection policy of the UE receiving the ProSe is NOT NEEDED, it is determined that the negotiation result of the UP integrity protection policy is NOT NEEDED. That is, if there is no security policy conflict between the UE receiving the ProSe and the UE initiating the ProSe, when the UP integrity protection policy of one ProSe UE of the UE initiating the ProSe and the UE receiving the ProSe is NOT NEEDED, it is determined that the negotiation result of the UP integrity protection policy is NOT NEEDED.

When the UP integrity protection policy of the UE initiating the ProSe is REQUIRED, and/or the UP integrity protection policy of the UE receiving the ProSe is REQUIRED, it is determined that the negotiation result of the UP integrity protection policy is REQUIRED. That is, if there is no security policy conflict between the UE receiving the ProSe and the UE initiating the ProSe, when the UP integrity protection policy of one ProSe UE of the UE initiating the ProSe and the UE receiving the ProSe is REQUIRED, it is determined that the negotiation result of the UP integrity protection policy is REQUIRED.

When the UP integrity protection policy of the UE initiating the ProSe is PREFERRED, and the UP integrity protection policy of the UE receiving the ProSe is PREFERRED, it is determined that the negotiation result of the UP integrity protection policy is REQUIRED or NOT NEEDED.

When the UP encryption protection policy of the UE initiating the ProSe is NOT NEEDED, and/or the UP encryption protection policy of the UE receiving the ProSe is NOT NEEDED, it is determined that the negotiation result of the UP encryption protection policy is NOT NEEDED. That is, if there is no security policy conflict between the UE receiving the ProSe and the UE initiating the ProSe, when the UP encryption protection policy of one ProSe UE of the UE initiating the ProSe and the UE receiving the ProSe is NOT NEEDED, it is determined that the negotiation result of the UP encryption protection policy is NOT NEEDED.

When the UP encryption protection policy of the UE initiating the ProSe is REQUIRED, and/or the UP encryption protection policy of the UE receiving the ProSe is REQUIRED, it is determined that the negotiation result of the UP encryption protection policy is REQUIRED. That is, if there is no security policy conflict between the UE receiving the ProSe and the UE initiating the ProSe, when the UP encryption protection policy of one ProSe UE of the UE initiating the ProSe and the UE receiving the ProSe is REQUIRED, it is determined that the negotiation result of the UP encryption protection policy is REQUIRED.

When the UP encryption protection policy of the UE initiating the ProSe is PREFERRED, and the UP encryption protection policy of the UE receiving the ProSe is PREFERRED, it is determined that the negotiation result of the UP encryption protection policy is REQUIRED or NOT NEEDED.

At step 709, a direct communication accept message is sent to the UE initiating the ProSe. The direct communication accept message includes the negotiation result of the UP security policy.

In an embodiment of the present disclosure, the negotiation result of the UP security policy included in the direct communication accept message may be a negotiation result determined at step 708.

In summary, in the method for direct communication provided in the embodiments of the disclosure, the UE receiving the ProSe can acquire the security policy corresponding to the ProSe, and establish direct communication security with the UE initiating the ProSe based on the acquired security policy. Therefore, in the embodiments of the disclosure, the security policy corresponding to the ProSe can be configured for the UE, so that the UE receiving the ProSe and the UE initiating the ProSe can establish direct communication security based on the security policy. Therefore, the direct communication security between the UEs in the ProSe is guaranteed, thereby improving security of information transmission.

Figure 8:
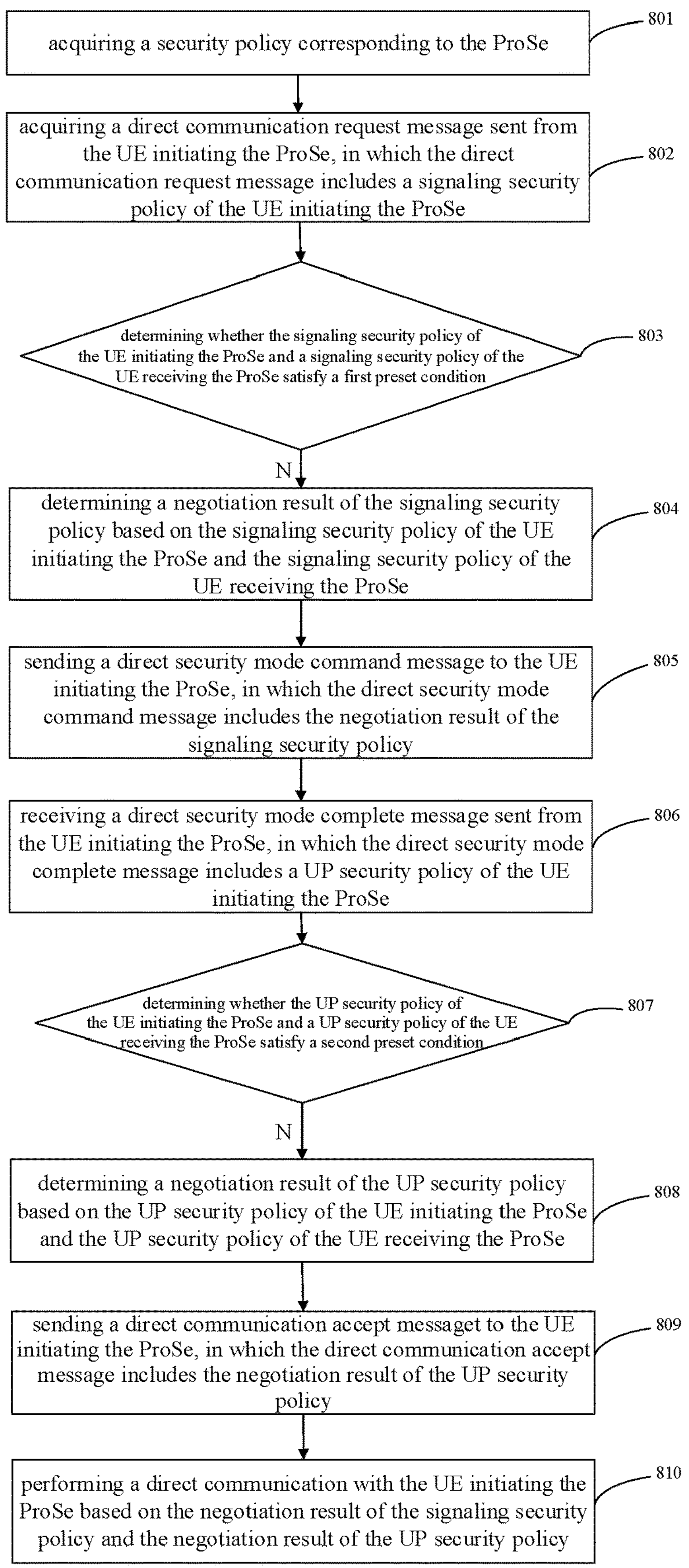
FIG. 8 is a flowchart illustrating a method for direct communication performed by a UE receiving a ProSe according to another embodiment of the present disclosure.

FIG. 8 is a flowchart illustrating a method for direct communication according to another embodiment of the present disclosure. As illustrated in FIG. 8, the method for direct communication is performed by a UE receiving a ProSe, and may include following steps.

At step 801, a security policy corresponding to the ProSe is acquired.

At step 802, a direct communication request message sent from the UE initiating the ProSe is acquired. The direct communication request message includes a signaling security policy of the UE initiating the ProSe.

At step 803, whether the signaling security policy of the UE initiating the ProSe and a signaling security policy of the UE receiving the ProSe satisfy a first predefined condition is determined.

In an embodiment of the disclosure, when it is determined that the signaling security policy of the UE initiating the ProSe and the signaling security policy of the UE receiving the ProSe do not satisfy the first predefined condition, it indicates that there is no security policy conflict between the UE initiating the ProSe and the UE receiving the ProSe, and both are qualified for direct communication, and step 804 continues to be executed.

At step 804, a negotiation result of the signaling security policy is determined based on the signaling security policy of the UE initiating the ProSe and the signaling security policy of the UE receiving the ProSe.

At step 805, a direct security mode command message is sent to the UE initiating the ProSe. The direct security mode command message includes the negotiation result of the signaling security policy.

At step 806, a direct security mode complete message sent from the UE initiating the ProSe is received. The direct security mode complete message includes a UP security policy of the UE initiating the ProSe.

At step 807, it is determined whether the UP security policy of the UE initiating the ProSe and a UP security policy of the UE receiving the ProSe satisfy a second predefined condition.

In an embodiment of the disclosure, when it is determined that the signaling security policy of the UE initiating the ProSe and the signaling security policy of the UE receiving the ProSe do not satisfy the second predefined condition, it indicates that there is no security policy conflict between the UE initiating the ProSe and the UE receiving the ProSe, and both are qualified for direct communication, and step 808 continues to be executed.

In addition, it needs to be noted that, in an embodiment of the disclosure, before it is determined whether the UP security policy of the UE initiating the ProSe and a signaling security policy of the UE receiving the ProSe satisfy the second predefined condition at step 807, the UE receiving the ProSe may determine whether the negotiation result of the signaling security policy determined at step 804 is NOT NEEDED, and if so, the UP security policy of the UE receiving the ProSe may be changed to NOT NEEDED. And determining whether the UP security policy of the UE initiating the ProSe and the UP security policy of the UE receiving the ProSe satisfy the second predefined condition specifically includes: determining whether the UP security policy of the UE initiating the ProSe and the changed UP security policy of the UE receiving the ProSe satisfy the second predefined condition.

At step 808, a negotiation result of the UP security policy is determined based on the UP security policy of the UE initiating the ProSe and the UP security policy of the UE receiving the ProSe.

At step 809, a direct communication accept message is sent to the UE initiating the ProSe. The direct communication accept message includes the negotiation result of the UP security policy.

The descriptions of steps 801 to 809 may to refer to related introduction of the above embodiments, which will not be repeated here.

At step 810, direct communication is performed with the UE initiating the ProSe based on the negotiation result of the signaling security policy and the negotiation result of the UP security policy.

In summary, in the method for direct communication provided in the embodiments of the disclosure, the UE receiving the ProSe can acquire the security policy corresponding to the ProSe, and establish direct communication security with the UE initiating the ProSe based on the acquired security policy. Therefore, in the embodiments of the disclosure, the security policy corresponding to the ProSe can be configured for the UE, so that the UE receiving the ProSe and the UE initiating the ProSe can establish direct communication security based on the security policy. Therefore, the direct communication security between the UEs in the ProSe is guaranteed, thereby improving security of information transmission.

Figures 9, 10:
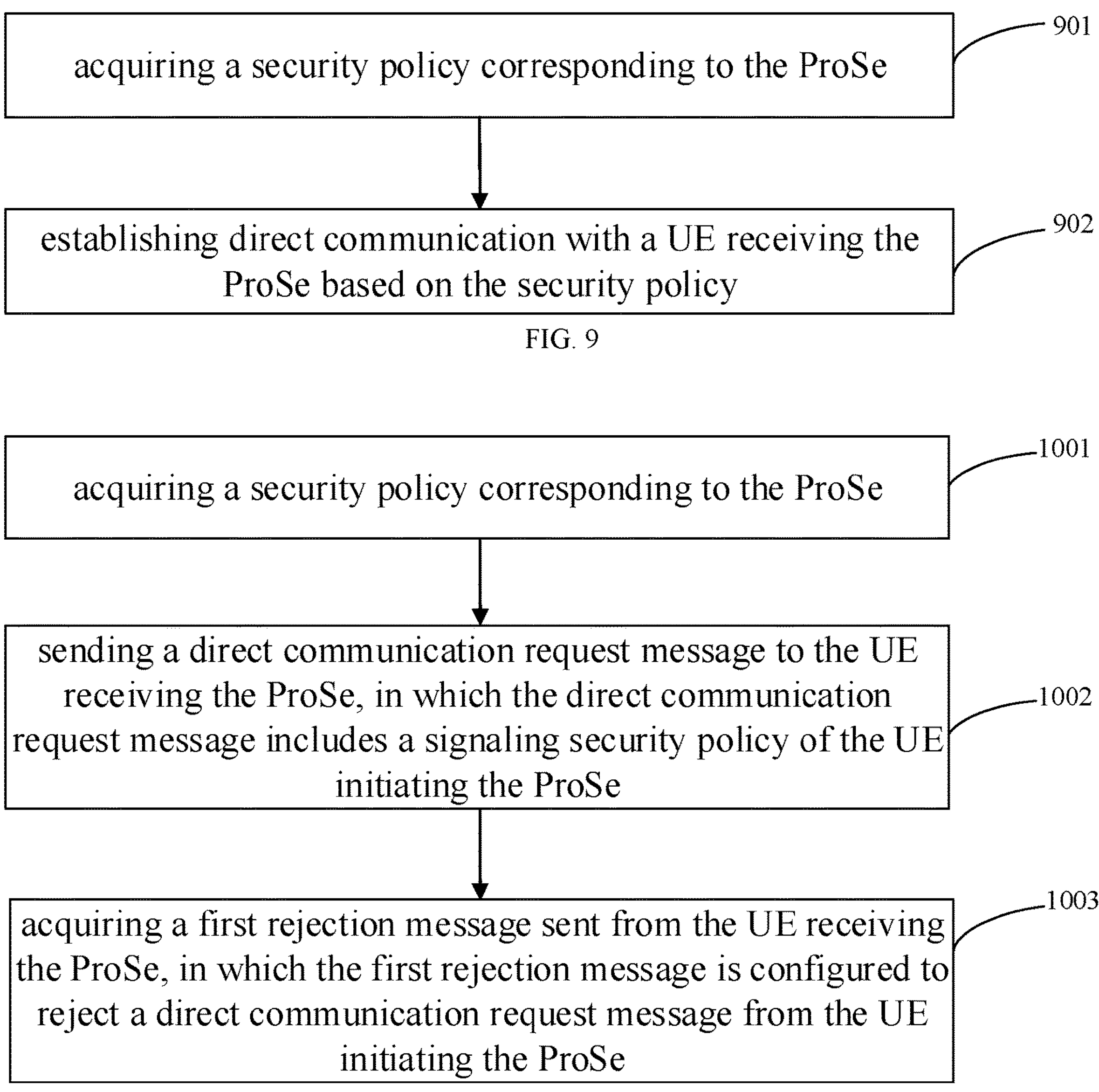
FIG. 9 is a flowchart illustrating a method for direct communication performed by a UE initiating a ProSe according to another embodiment of the present disclosure.
FIG. 10 is a flowchart illustrating a method for direct communication performed by a UE initiating a ProSe according to another embodiment of the present disclosure.

FIG. 9 is a flowchart illustrating a method for direct communication according to another embodiment of the present disclosure. As illustrated in FIG. 9, the method for direct communication is performed by a UE initiating a ProSe, and may include following steps.

At step 901, a security policy corresponding to the ProSe is acquired.

At step 902, direct communication is established with a UE receiving the ProSe based on the security policy.

The descriptions of steps 901 to 902 may to refer to related introduction of the above embodiments, which will not be repeated here.

In summary, in the method for direct communication provided in the embodiments of the disclosure, the UE initiating the ProSe can acquire the security policy corresponding to the ProSe, and establish direct communication security with the UE receiving the ProSe based on the acquired security policy. Therefore, in the embodiments of the disclosure, the security policy corresponding to the ProSe can be configured for the UE, so that the UE receiving the ProSe and the UE initiating the ProSe can establish direct communication security based on the security policy. Therefore, the direct communication security between the UEs in the ProSe is guaranteed, thereby improving security of information transmission.

FIG. 10 is a flowchart illustrating a method for direct communication according to another embodiment of the present disclosure. As illustrated in FIG. 10, the method for direct communication is performed by a UE initiating a ProSe, and may include following steps.

At step 1001, a security policy corresponding to the ProSe is acquired.

The descriptions of step 1001 may to refer to related introduction of the above embodiments, which will not be repeated here.

At step 1002, a direct communication request message is sent to a UE receiving the ProSe. The direct communication request message includes a signaling security policy of the UE initiating the ProSe.

At step 1003, a first rejection message sent from the UE receiving the ProSe is acquired. The first rejection message is configured to reject a direct communication request message sent from the UE initiating the ProSe.

In an embodiment of the disclosure, after the direct communication request message sent from the UE initiating the ProSe is received, whether the signaling security policy of the UE initiating the ProSe and the signaling security policy of the UE receiving the ProSe satisfy the first predefined condition may be determined. In an embodiment of the disclosure, when it is determined that the signaling security policy of the UE initiating the ProSe and the signaling security policy of the UE receiving the ProSe satisfy the first predefined condition, it indicates that there is a security policy conflict between the UE initiating the ProSe and the UE receiving the ProSe, and both are not qualified for direct communication, and the UE receiving the ProSe may send the first rejection message to the UE initiating the ProSe.

In summary, in the method for direct communication provided in the embodiments of the disclosure, the UE initiating the ProSe can acquire the security policy corresponding to the ProSe, and establish direct communication security with the UE receiving the ProSe based on the acquired security policy. Therefore, in the embodiments of the disclosure, the security policy corresponding to the ProSe can be configured for the UE, so that the UE receiving the ProSe and the UE initiating the ProSe can establish direct communication security based on the security policy. Therefore, the direct communication security between the UEs in the ProSe is guaranteed, thereby improving security of information transmission.

Figure 11:
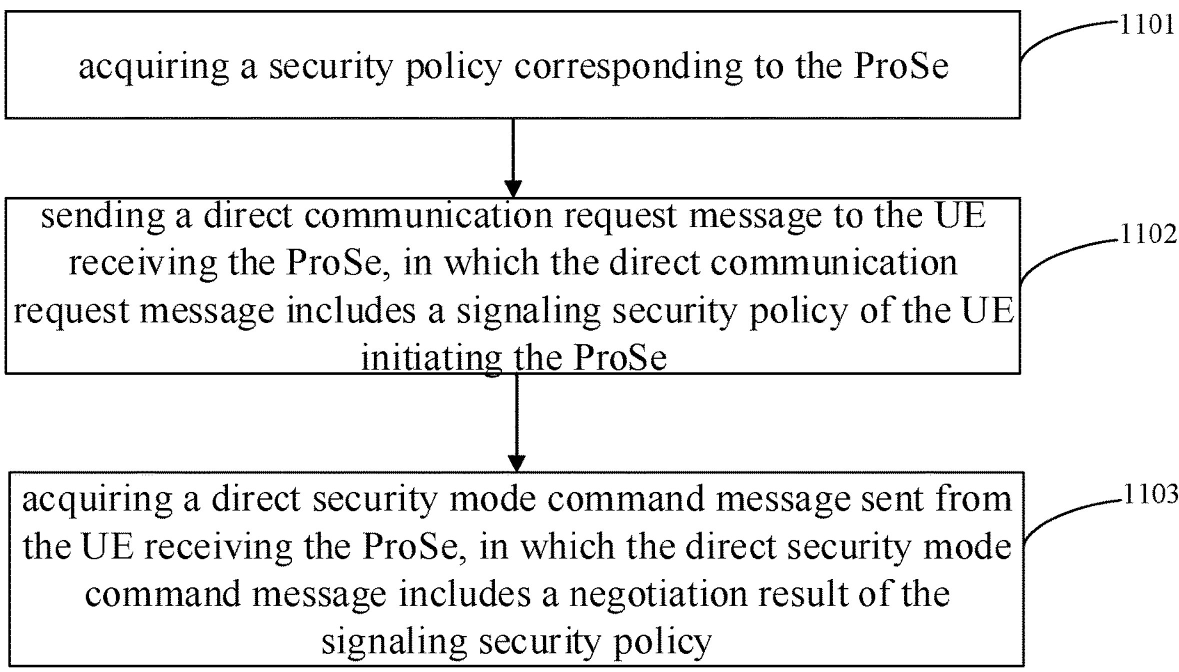
FIG. 11 is a flowchart illustrating a method for direct communication performed by a UE initiating a ProSe according to another embodiment of the present disclosure.

FIG. 11 is a flowchart illustrating a method for direct communication according to another embodiment of the present disclosure. As illustrated in FIG. 11, the method for direct communication is performed by a UE initiating a ProSe, and may include following steps.

At step 1101, a security policy corresponding to the ProSe is acquired.

At step 1102, a direct communication request message is sent to the UE receiving the ProSe. The direct communication request message includes a signaling security policy of the UE initiating the ProSe.

The descriptions of steps 1101 to 1102 may to refer to related introduction of the above embodiments, which will not be repeated here.

At step 1103, a direct security mode command message sent from the UE receiving the ProSe is acquired. The direct security mode command message includes a negotiation result of the signaling security policy.

In an embodiment of the disclosure, after the direct communication request message sent from the UE initiating the ProSe is received, whether the signaling security policy of the UE initiating the ProSe and the signaling security policy of the UE receiving the ProSe satisfy the first predefined condition may be determined.

In an embodiment of the disclosure, when it is determined that the signaling security policy of the UE initiating the ProSe and the signaling security policy of the UE receiving the ProSe do not satisfy the first predefined condition, it indicates that there is no security policy conflict between the UE initiating the ProSe and the UE receiving the ProSe, and both are qualified for direct communication, and the UE receiving the ProSe may determine a negotiation result of the signaling security policy based on the signaling security policy of the UE initiating the ProSe and the signaling security policy of the UE receiving the ProSe. Then, a direct security mode command message may be sent to the UE initiating the ProSe. The direct security mode command message includes the negotiation result of the signaling security policy.

In summary, in the method for direct communication provided in the embodiments of the disclosure, the UE initiating the ProSe can acquire the security policy corresponding to the ProSe, and establish direct communication security with the UE receiving the ProSe based on the acquired security policy. Therefore, in the embodiments of the disclosure, the security policy corresponding to the ProSe may be configured for the UE, so that the UE receiving the ProSe and the UE initiating the ProSe can establish direct communication security based on the security policy. Therefore, the direct communication security between the UEs in the ProSe is guaranteed, thereby improving security of information transmission.

Figure 12:
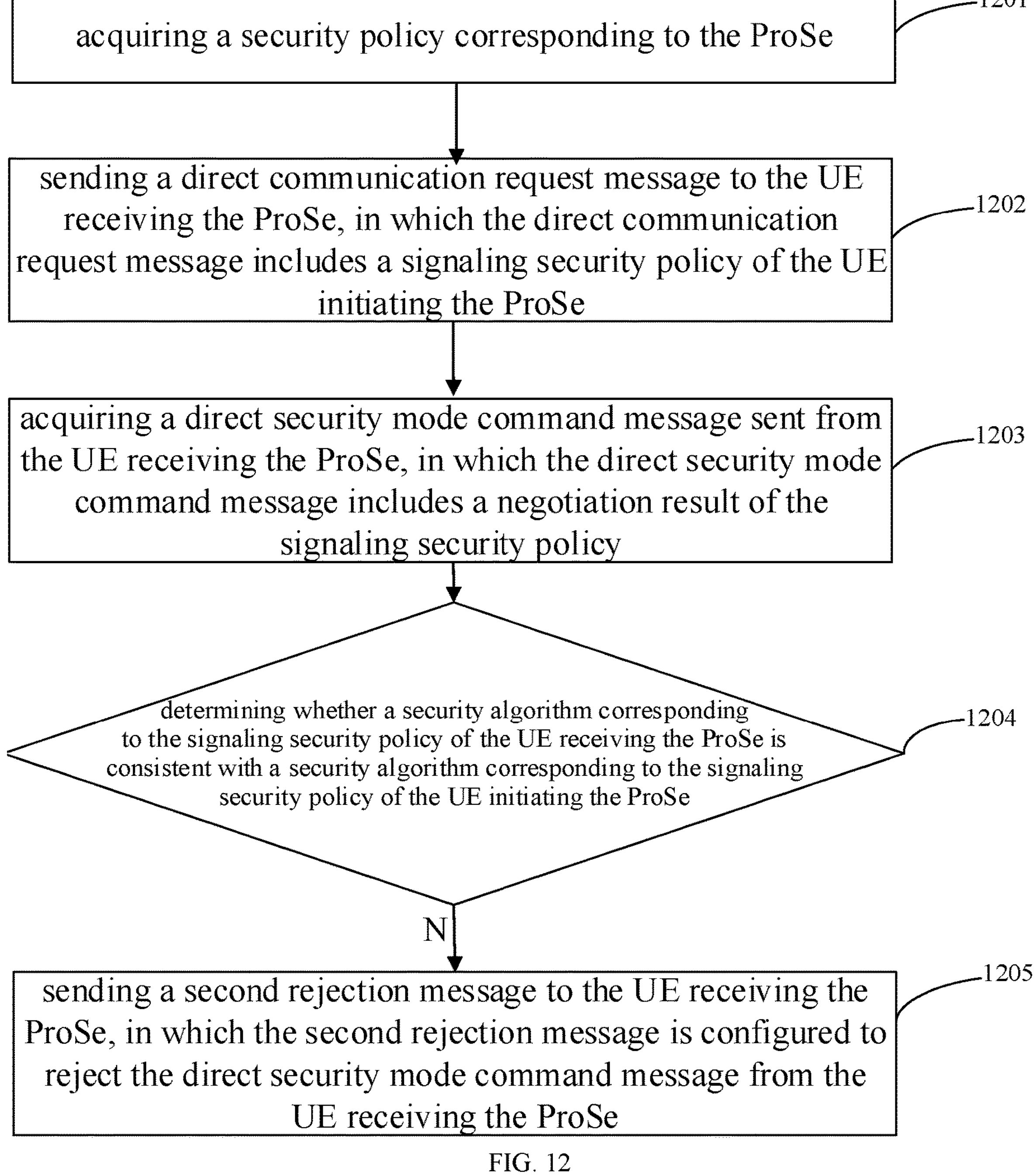
FIG. 12 is a flowchart illustrating a method for direct communication performed by a UE initiating a ProSe according to another embodiment of the present disclosure.

FIG. 12 is a flowchart illustrating a method for direct communication according to another embodiment of the present disclosure. As illustrated in FIG. 12, the method for direct communication is performed by a UE initiating a ProSe, and may include following steps.

At step 1201, a security policy corresponding to the ProSe is acquired.

At step 1202, a direct communication request message is sent to the UE receiving the ProSe. The direct communication request message includes a signaling security policy of the UE initiating the ProSe.

At step 1203, a direct security mode command message sent from the UE receiving the ProSe is acquired. The direct security mode command message includes a negotiation result of the signaling security policy.

The descriptions of steps 1201 to 1203 may to refer to related introduction of the above embodiments, which will not be repeated here.

At step 1204, it is determined whether a security algorithm corresponding to the signaling security policy of the UE receiving the ProSe is consistent with a security algorithm corresponding to the signaling security policy of the UE initiating the ProSe.

In an embodiment of the present disclosure, the signaling security policy has a corresponding security algorithm. In an embodiment of the present disclosure, the security algorithm corresponding to the signaling security policy of the UE receiving the ProSe may be consistent with the security algorithm corresponding to the signaling security policy of the UE initiating the ProSe. In an embodiment of the present disclosure, the security algorithm corresponding to the signaling security policy of the UE receiving the ProSe may be inconsistent with the security algorithm corresponding to the signaling security policy of the UE initiating the ProSe.

Specifically, in an embodiment of the disclosure, when the UE initiating the ProSe determines that the security algorithm corresponding to the signaling security policy of the UE receiving the ProSe is inconsistent with the security algorithm corresponding to the signaling security policy of the UE itself, it indicates that the UE receiving the ProSe and the UE for sending the ProSe are not qualified for protection direct communication, and step 1205 continues to be executed.

At step 1205, a second rejection message is sent to the UE receiving the ProSe. The second rejection message is configured to reject the direct security mode command message sent from the UE receiving the ProSe.

In summary, in the method for direct communication provided in the embodiments of the disclosure, the UE initiating the ProSe can acquire the security policy corresponding to the ProSe, and establish direct communication security with the UE receiving the ProSe based on the acquired security policy. Therefore, in the embodiments of the disclosure, the security policy corresponding to the ProSe may be configured for the UE, so that the UE receiving the ProSe and the UE initiating the ProSe can establish direct communication security based on the security policy. Therefore, the direct communication security between the UEs in the ProSe is guaranteed, thereby improving security of information transmission.

Figure 13:
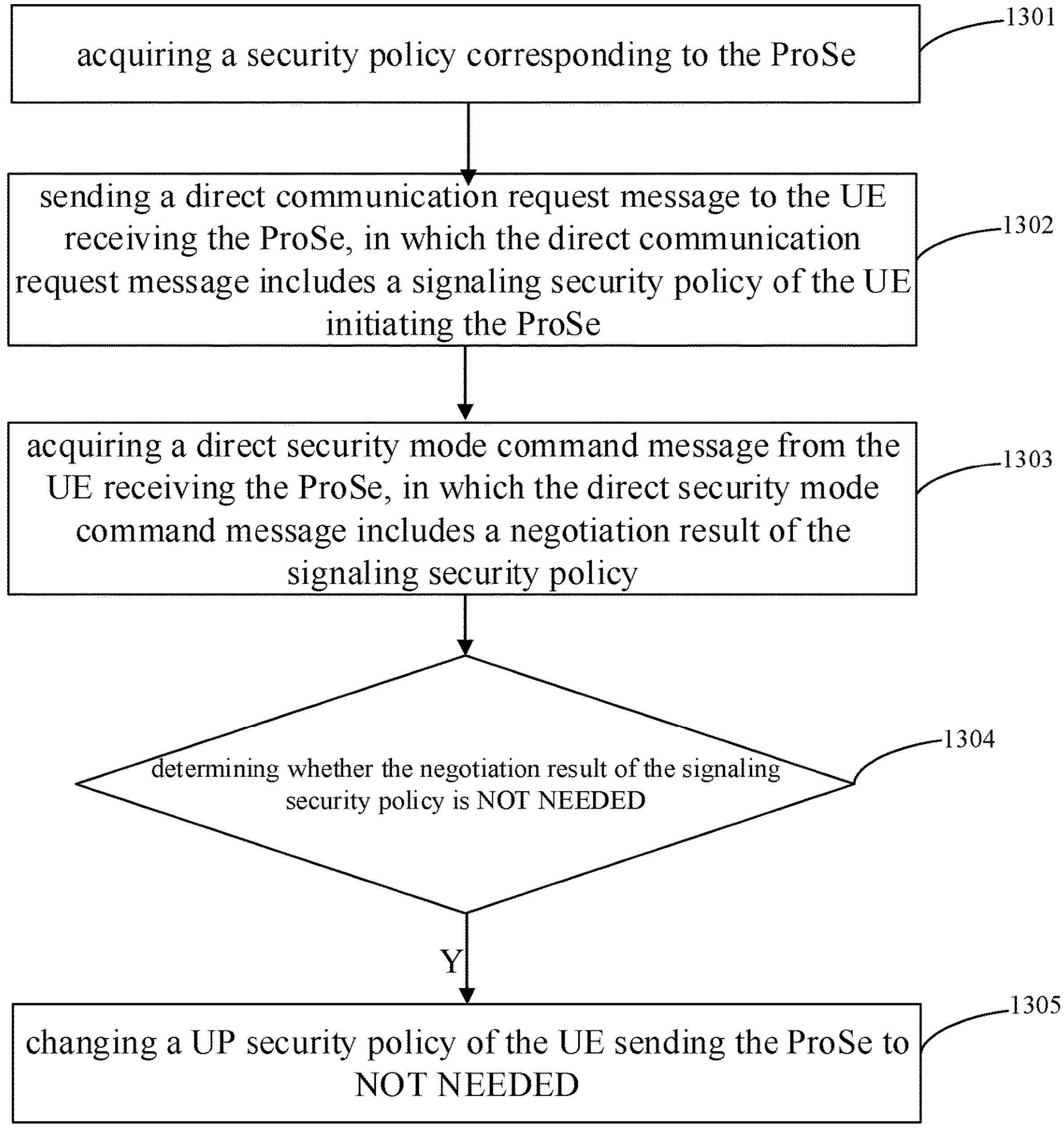
FIG. 13 is a flowchart illustrating a method for direct communication performed by a UE initiating a ProSe according to another embodiment of the present disclosure.

FIG. 13 is a flowchart illustrating a method for direct communication according to another embodiment of the present disclosure. As illustrated in FIG. 13, the method for direct communication is performed by a UE initiating a ProSe, and may include following steps.

At step 1301, a security policy corresponding to the ProSe is acquired.

At step 1302, a direct communication request message is sent to the UE receiving the ProSe. The direct communication request message includes a signaling security policy of the UE initiating the ProSe.

At step 1303, a direct security mode command message sent from the UE receiving the ProSe is acquired. The direct security mode command message includes a negotiation result of the signaling security policy.

The descriptions of steps 1301 to 1303 may to refer to related introduction of the above embodiments, which will not be repeated here.

At step 1304, it is determined whether the negotiation result of the signaling security policy is NOT NEEDED.

In an embodiment of the present disclosure, when the negotiation result of the signaling security policy is NOT NEEDED, step 1305 continues to be executed.

At step 1305, a UP security policy of the UE initiating the ProSe is changed to NOT NEEDED.

In another embodiment of the disclosure, when the negotiation result of the signaling encryption protection policy is NOT NEEDED, it indicates that the signaling between the UE initiating the ProSe and the UE receiving the ProSe does not needing a security protection and the negotiated encryption algorithm is a NULL algorithm, in which case, the UP encryption protection policy of the UE initiating the ProSe may be changed to NOT NEEDED.

In summary, in the method for direct communication provided in the embodiments of the disclosure, the UE receiving the ProSe can acquire the security policy corresponding to the ProSe, and establish direct communication security with the UE receiving the ProSe based on the acquired security policy. Therefore, in the embodiments of the disclosure, the security policy corresponding to the ProSe may be configured for the UE, so that the UE receiving the ProSe and the UE initiating the ProSe can establish direct communication security based on the security policy. Therefore, the direct communication security between the UEs in the ProSe is guaranteed, thereby improving security of information transmission.

Figure 14:
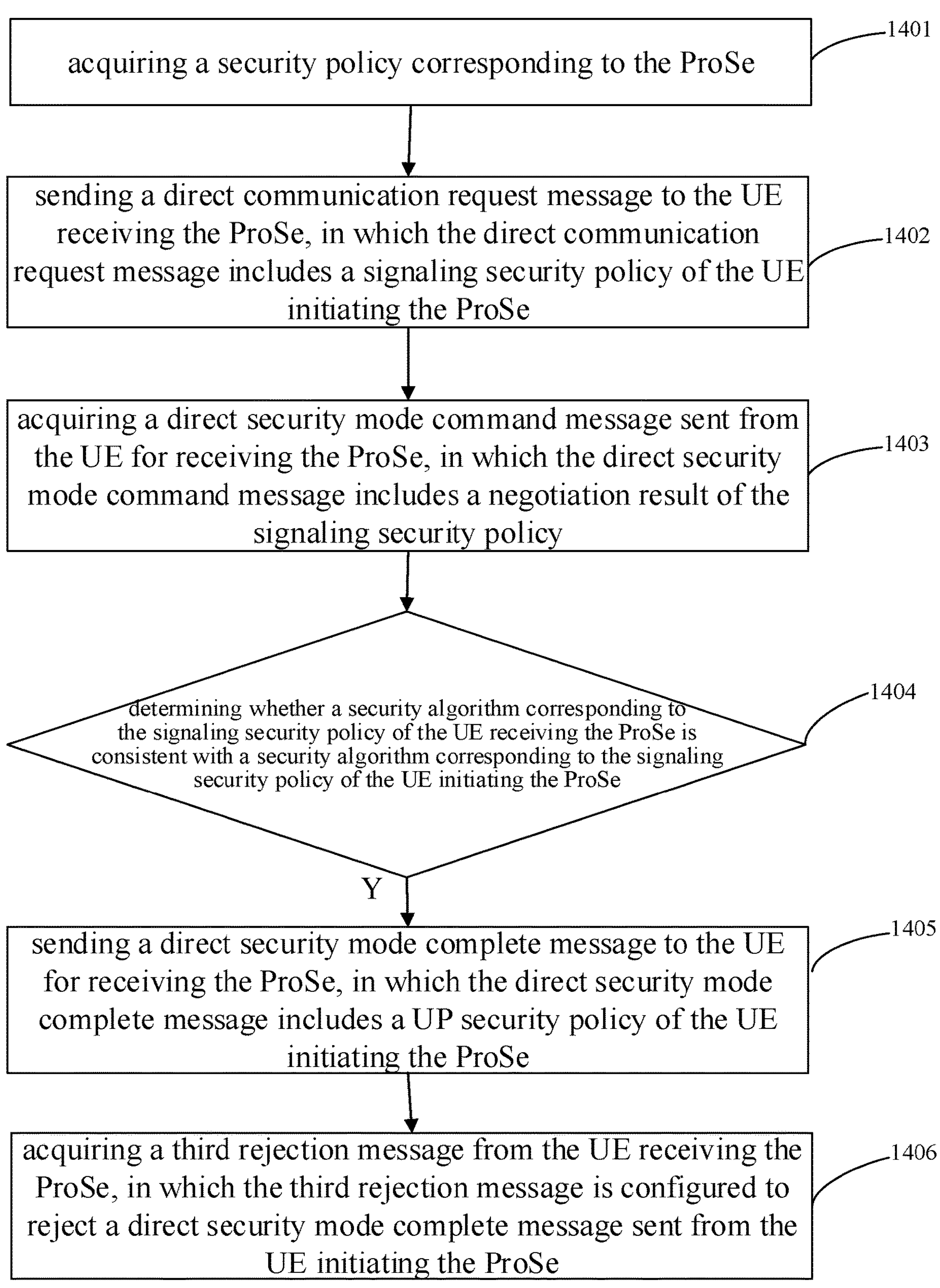
FIG. 14 is a flowchart illustrating a method for direct communication performed by a UE initiating a ProSe according to another embodiment of the present disclosure.

FIG. 14 is a flowchart illustrating a method for direct communication according to another embodiment of the present disclosure. As illustrated in FIG. 14, the method for direct communication is performed by a UE initiating a ProSe, and may include following steps.

At step 1401, a security policy corresponding to the ProSe is acquired.

At step 1402, a direct communication request message is sent to the UE receiving the ProSe. The direct communication request message includes a signaling security policy of the UE initiating the ProSe.

At step 1403, a direct security mode command message sent from the UE receiving the ProSe is acquired. The direct security mode command message includes a negotiation result of the signaling security policy.

The descriptions of steps 1401 to 1403 may to refer to related introduction of the above embodiments, which will not be repeated here.

At step 1404, it is determined whether a security algorithm corresponding to the signaling security policy of the UE receiving the ProSe is consistent with a security algorithm corresponding to the signaling security policy of the UE initiating the ProSe.

In an embodiment of the disclosure, when the UE initiating the ProSe determines that the security algorithm corresponding to the signaling security policy of the UE receiving the ProSe is consistent with the security algorithm corresponding to the signaling security policy of the UE itself, it indicates that the UE receiving the ProSe and the UE initiating the ProSe are qualified for direct communication protection, and step 1405 continues to be executed.

At step 1405, a direct security mode complete message is sent to the UE receiving the ProSe. The direct security mode complete message includes a UP security policy of the UE initiating the ProSe.

It needs to be noted that, in an embodiment of the disclosure, before the direct security mode complete message is sent to the UE receiving the ProSe at step 1405, the UE initiating the ProSe may determine whether the negotiation result of the signaling security policy received at step 1403 is NOT NEEDED, and if so, the UP security policy of the UE initiating the ProSe may be changed to NOT NEEDED. When the direct security mode complete message is sent to the UE receiving the ProSe, the direct security mode complete message specifically includes a changed UP security policy of the UE initiating the ProSe.

At step 1406, a third rejection message sent from the UE receiving the ProSe is acquired. The third rejection message is configured to reject a direct security mode complete message sent from the UE initiating the ProSe.

In an embodiment of the disclosure, after the UE receiving the ProSe acquires the direct security mode complete message sent from the UE initiating the ProSe, whether the UP security policy of the UE initiating the ProSe and the UP security policy of the UE receiving the ProSe satisfy the second predefined condition may be determined. In an embodiment of the disclosure, when it is determined that the UP security policy of the UE initiating the ProSe and the UP security policy of the UE receiving the ProSe satisfy the second predefined condition, it indicates that there is a security policy conflict between the UE initiating the ProSe and the UE receiving the ProSe, and both are not qualified for direct communication, and the UE receiving the ProSe may send the third rejection message to the UE initiating the ProSe.

In summary, in the method for direct communication provided in the embodiments of the disclosure, the UE initiating the ProSe can acquire the security policy corresponding to the ProSe, and establish direct communication security with the UE receiving the ProSe based on the acquired security policy. Therefore, in the embodiments of the disclosure, the security policy corresponding to the ProSe can be configured for the UE, so that the UE receiving the ProSe and the UE initiating the ProSe can establish direct communication security based on the security policy. Therefore, the direct communication security between the UEs in the ProSe is guaranteed, thereby improving security of information transmission.

Figure 15:
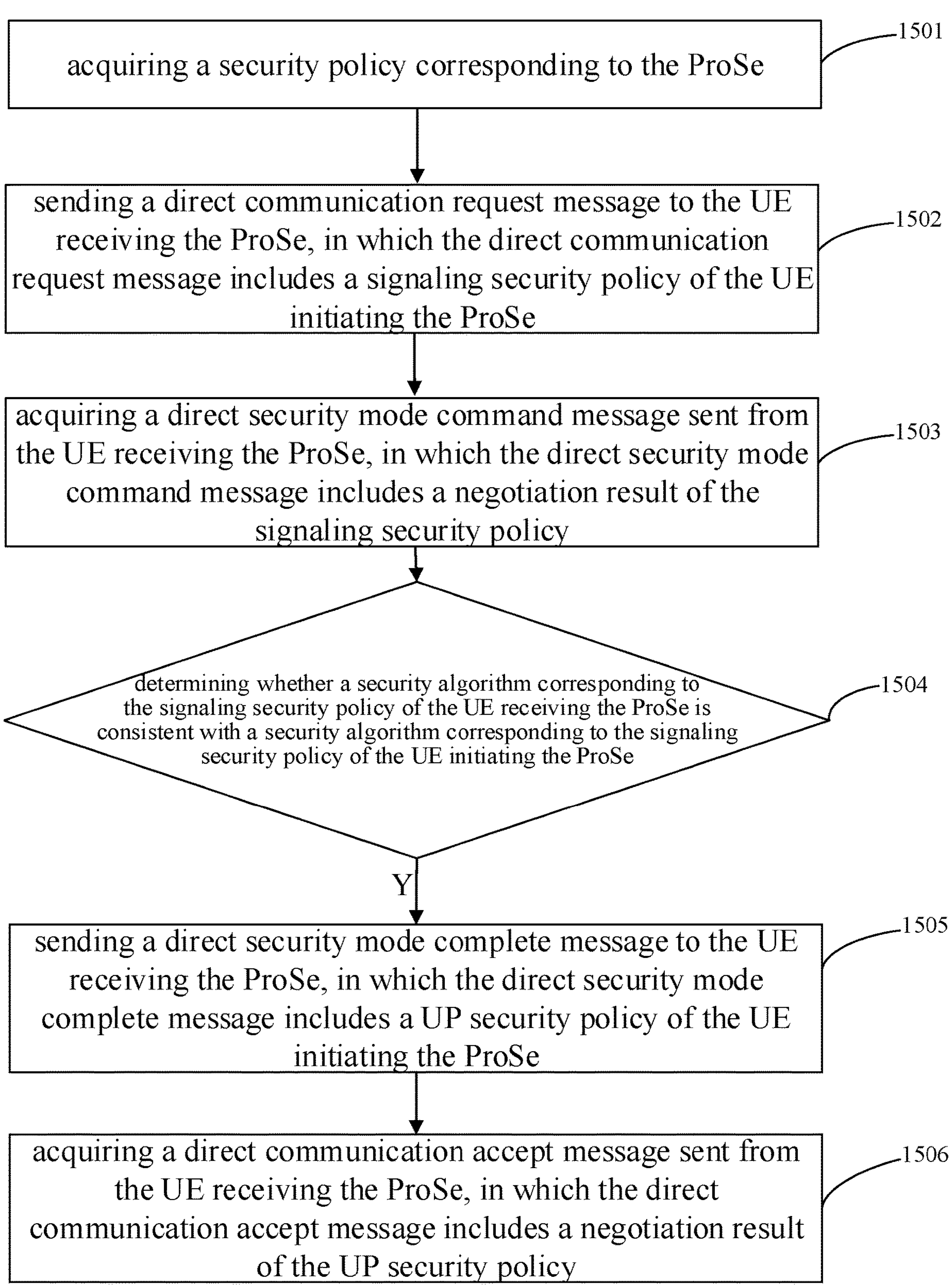
FIG. 15 is a flowchart illustrating a method for direct communication performed by a UE initiating a ProSe according to another embodiment of the present disclosure.

FIG. 15 is a flowchart illustrating a method for direct communication according to another embodiment of the present disclosure. As illustrated in FIG. 15, the method for direct communication is performed by a UE initiating a ProSe, and may include following steps.

At step 1501, a security policy corresponding to the ProSe is acquired.

At step 1502, a direct communication request message is sent to the UE receiving the ProSe. The direct communication request message includes a signaling security policy of the UE initiating the ProSe.

At step 1503, a direct security mode command message sent from the UE receiving the ProSe is acquired. The direct security mode command message includes a negotiation result of the signaling security policy.

At step 1504, it is determined whether a security algorithm corresponding to the signaling security policy of the UE receiving the ProSe is consistent with a security algorithm corresponding to the signaling security policy of the UE initiating the ProSe.

In an embodiment of the disclosure, when the UE initiating the ProSe determines that the security algorithm corresponding to the signaling security policy of the UE receiving the ProSe is consistent with the security algorithm corresponding to the signaling security policy of the UE itself, it indicates that the UE receiving the ProSe and the UE for sending the ProSe are qualified for protecting direct communication, and step 1505 continues to be executed.

At step 1505, a direct security mode complete message is sent to the UE receiving the ProSe. The direct security mode complete message includes a UP security policy of the UE initiating the ProSe.

The descriptions of steps 1501 to 1505 may to refer to related introduction of the above embodiments, which will not be repeated here.

It needs to be noted that, in an embodiment of the disclosure, before the direct security mode complete message is sent to the UE receiving the ProSe at step 1505, the UE initiating the ProSe may determine whether the negotiation result of the signaling security policy received at step 1503 is NOT NEEDED, and if so, the UP security policy of the UE initiating the ProSe may be changed to NOT NEEDED. And, when the direct security mode complete message is sent to the UE receiving the ProSe, the direct security mode complete message specifically includes a changed UP security policy of the UE initiating the ProSe.

At step 1506, a direct communication accept message sent from the UE receiving the ProSe is acquired. The direct communication accept message includes a negotiation result of the UP security policy.

In an embodiment of the disclosure, after the UE receiving the ProSe acquires the direct security mode complete message sent from the UE initiating the ProSe, whether the UP security policy of the UE initiating the ProSe and the UP security policy of the UE receiving the ProSe satisfy the second predefined condition may be determined.

In an embodiment of the disclosure, when it is determined that the signaling security policy of the UE initiating the ProSe and the signaling security policy of the UE receiving the ProSe do not satisfy the second predefined condition, it indicates that there is no security policy conflict between the UE initiating the ProSe and the UE receiving the ProSe, and both are qualified for direct communication protection, and the UE receiving the ProSe may determine a negotiation result of the UP security policy based on the UP security policy of the UE initiating the ProSe and the UP security policy of the UE receiving the ProSe. Then, a direct communication accept message is sent to the UE initiating the ProSe. The direct communication accept message includes the negotiation result of the UP security policy.

In summary, in the method for direct communication provided in the embodiments of the disclosure, the UE receiving the ProSe can acquire the security policy corresponding to the ProSe, and establish direct communication security with the UE receiving the ProSe based on the acquired security policy. Therefore, in the embodiments of the disclosure, the security policy corresponding to the ProSe can be configured for the UE, so that the UE receiving the ProSe and the UE initiating the ProSe can establish direct communication security based on the security policy. Therefore, the direct communication security between the UEs in the ProSe is guaranteed, thereby improving security of information transmission.

Figure 16:
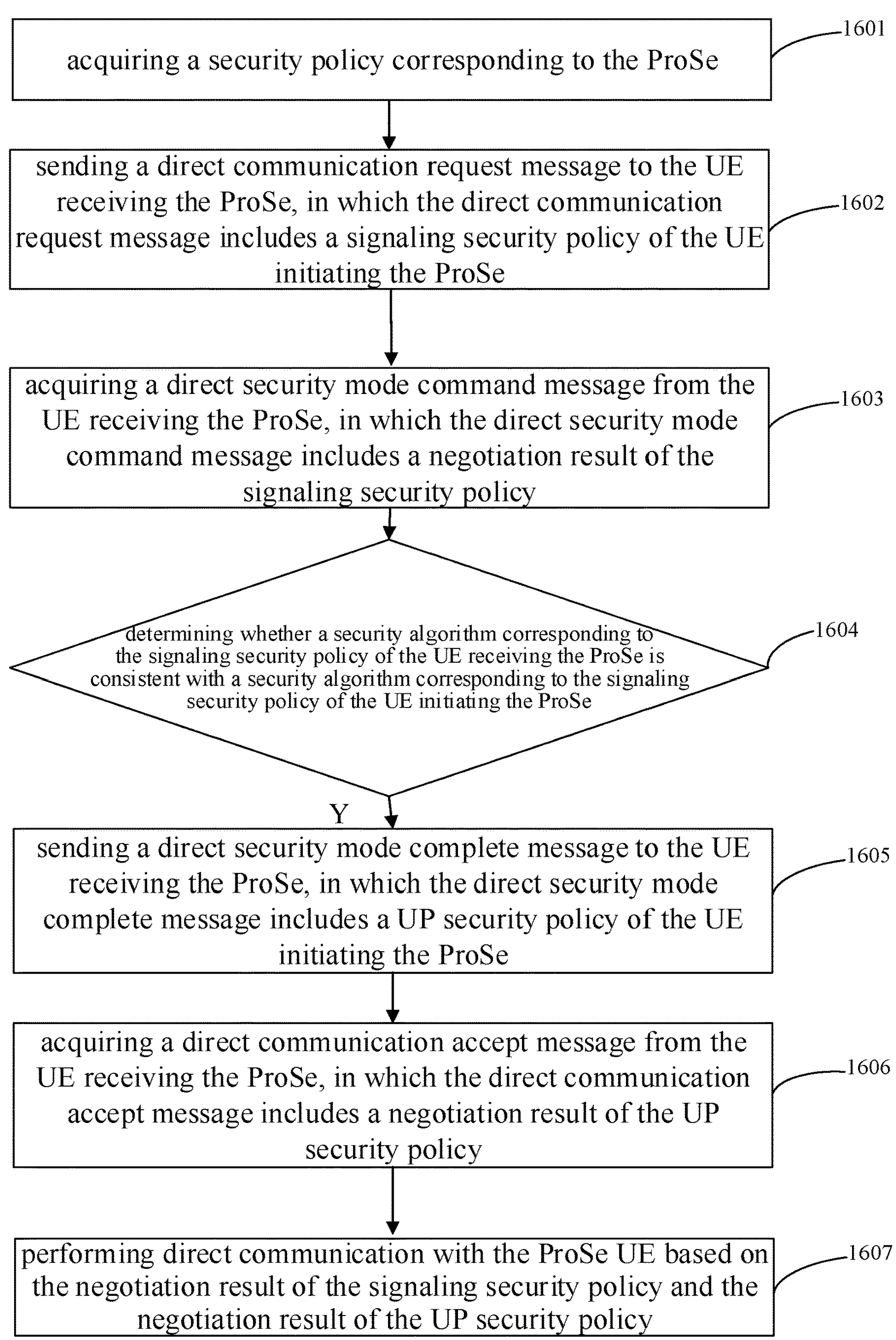
FIG. 16 is a flowchart illustrating a method for direct communication performed by a UE initiating a ProSe according to another embodiment of the present disclosure.

FIG. 16 is a flowchart illustrating a method for direct communication according to another embodiment of the present disclosure. As illustrated in FIG. 16, the method for direct communication is performed by a UE initiating a ProSe, and may include following steps.

At step 1601, a security policy corresponding to the ProSe is acquired.

At step 1602, a direct communication request message is sent to the UE receiving the ProSe. The direct communication request message includes a signaling security policy of the UE initiating the ProSe.

At step 1603, a direct security mode command message sent from the UE receiving the ProSe is acquired. The direct security mode command message includes a negotiation result of the signaling security policy.

At step 1604, it is determined whether a security algorithm corresponding to the signaling security policy of the UE receiving the ProSe is consistent with a security algorithm corresponding to the signaling security policy of the UE initiating the ProSe.

In an embodiment of the disclosure, when the UE initiating the ProSe determines that the security algorithm corresponding to the signaling security policy of the UE receiving the ProSe is consistent with the security algorithm corresponding to the signaling security policy of the UE itself, it indicates that the UE receiving the ProSe and the UE for sending the ProSe are qualified for direct communication protection, and step 1605 continues to be executed.

At step 1605, a direct security mode complete message is sent to the UE receiving the ProSe. The direct security mode complete message includes a UP security policy of the UE initiating the ProSe.

It needs to be noted that, in an embodiment of the disclosure, before the direct security mode complete message is sent to the UE receiving the ProSe at step 1605, the UE initiating the ProSe may determine whether the negotiation result of the signaling security policy received at step 1603 is NOT NEEDED, and if so, the UP security policy of the UE initiating the ProSe may be changed to NOT NEEDED. And, when the direct security mode complete message is sent to the UE receiving the ProSe, the direct security mode complete message specifically includes a changed UP security policy of the UE initiating the ProSe.

At step 1606, a direct communication accept message sent from the UE receiving the ProSe is acquired. The direct communication accept message includes a negotiation result of the UP security policy.

The descriptions of steps 1601 to 1606 may to refer to related introduction of the above embodiments, which will not be repeated here.

At step 1607, the direct communication is performed with the ProSe UE based on the negotiation result of the signaling security policy and the negotiation result of the UP security policy.

In summary, in the method for direct communication provided in the embodiments of the disclosure, the UE initiating the ProSe can acquire the security policy corresponding to the ProSe, and establish direct communication security with the UE receiving the ProSe based on the acquired security policy. Therefore, in the embodiments of the disclosure, the security policy corresponding to the ProSe can be configured for the UE, so that the UE receiving the ProSe and the UE initiating the ProSe can establish direct communication security based on the security policy. Therefore, the direct communication security between the UEs in the ProSe is guaranteed, thereby improving security of information transmission.

Figure 17:
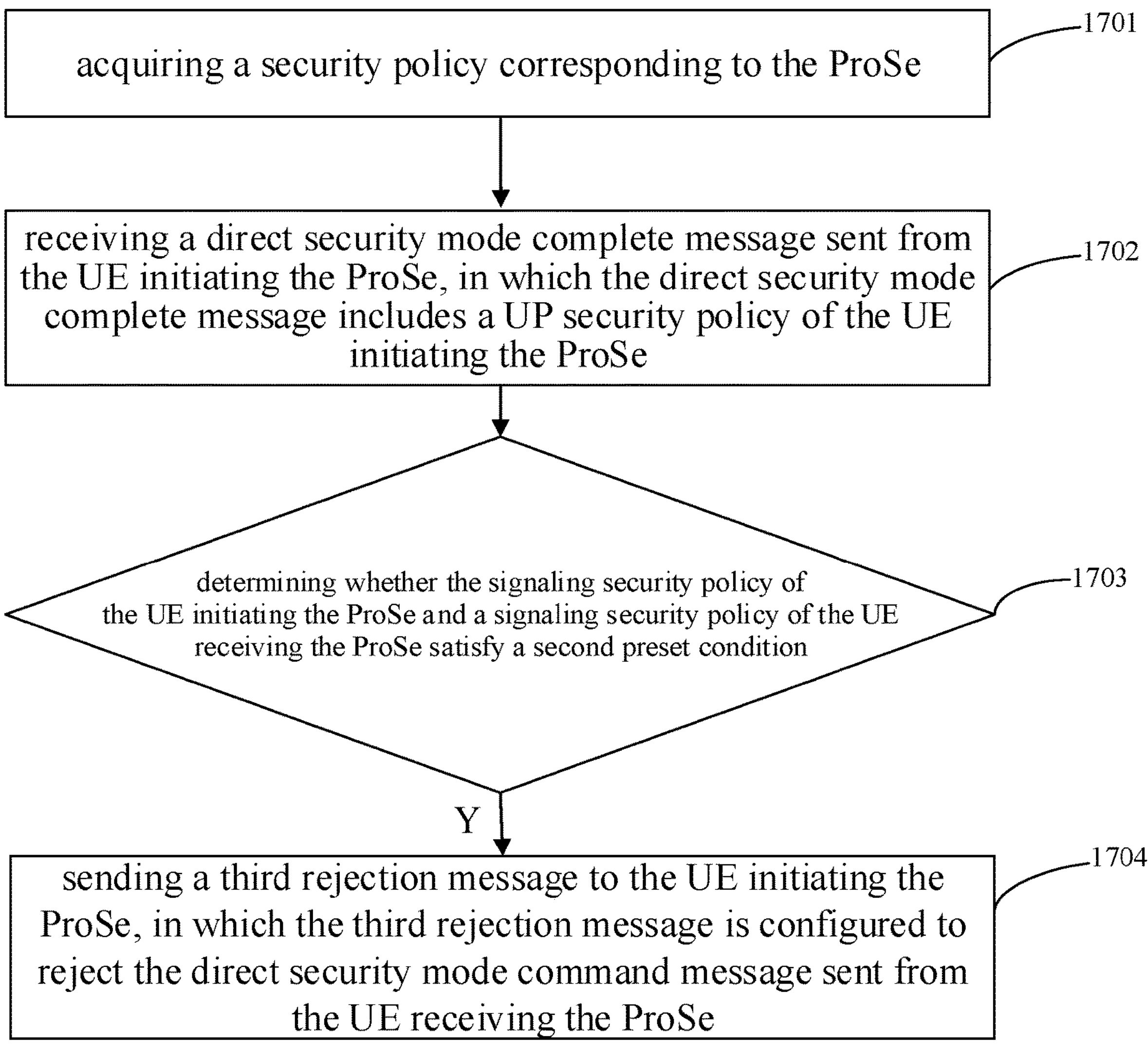
FIG. 17 is a flowchart illustrating a method for direct communication performed by a UE initiating a ProSe according to another embodiment of the present disclosure.

FIG. 17 is a flowchart illustrating a method for direct communication according to another embodiment of the present disclosure. As illustrated in FIG. 17, the method for direct communication is performed by a UE receiving a ProSe, and may include following steps.

At step 1701, a security policy corresponding to the ProSe is acquired.

At step 1702, a direct security mode complete message sent from the UE initiating the ProSe is received. The direct security mode complete message includes a UP security policy of the UE initiating the ProSe.

At step 1703, whether the signaling security policy of the UE initiating the ProSe and a signaling security policy of the UE receiving the ProSe satisfy a second predefined condition is determined, and if so, step 1704 is executed.

In an embodiment of the disclosure, when it is determined that the UP security policy of the UE initiating the ProSe and the signaling security policy of the UE receiving the ProSe satisfy the second predefined condition, it indicates that there is a security policy conflict between the UE initiating the ProSe and the UE receiving the ProSe, and both are not qualified for direct communication, and step 1704 continues to be executed.

At step 1704, a third rejection message is sent to the UE initiating the ProSe. The third rejection message is configured to reject the direct security mode complete message sent from the UE receiving the ProSe.

The descriptions of steps 1701 to 1704 may to refer to related introduction of the above embodiments, which will not be repeated here.

In summary, in the method for direct communication provided in the embodiments of the disclosure, the UE receiving the ProSe can acquire the security policy corresponding to the ProSe, and establish direct communication security with the UE initiating the ProSe based on the acquired security policy. Therefore, in the embodiments of the disclosure, the security policy corresponding to the ProSe can be configured for the UE, so that the UE receiving the ProSe and the UE initiating the ProSe can establish direct communication security based on the security policy. Therefore, the direct communication security between the UEs in the ProSe is guaranteed, thereby improving security of information transmission.

Figure 18:
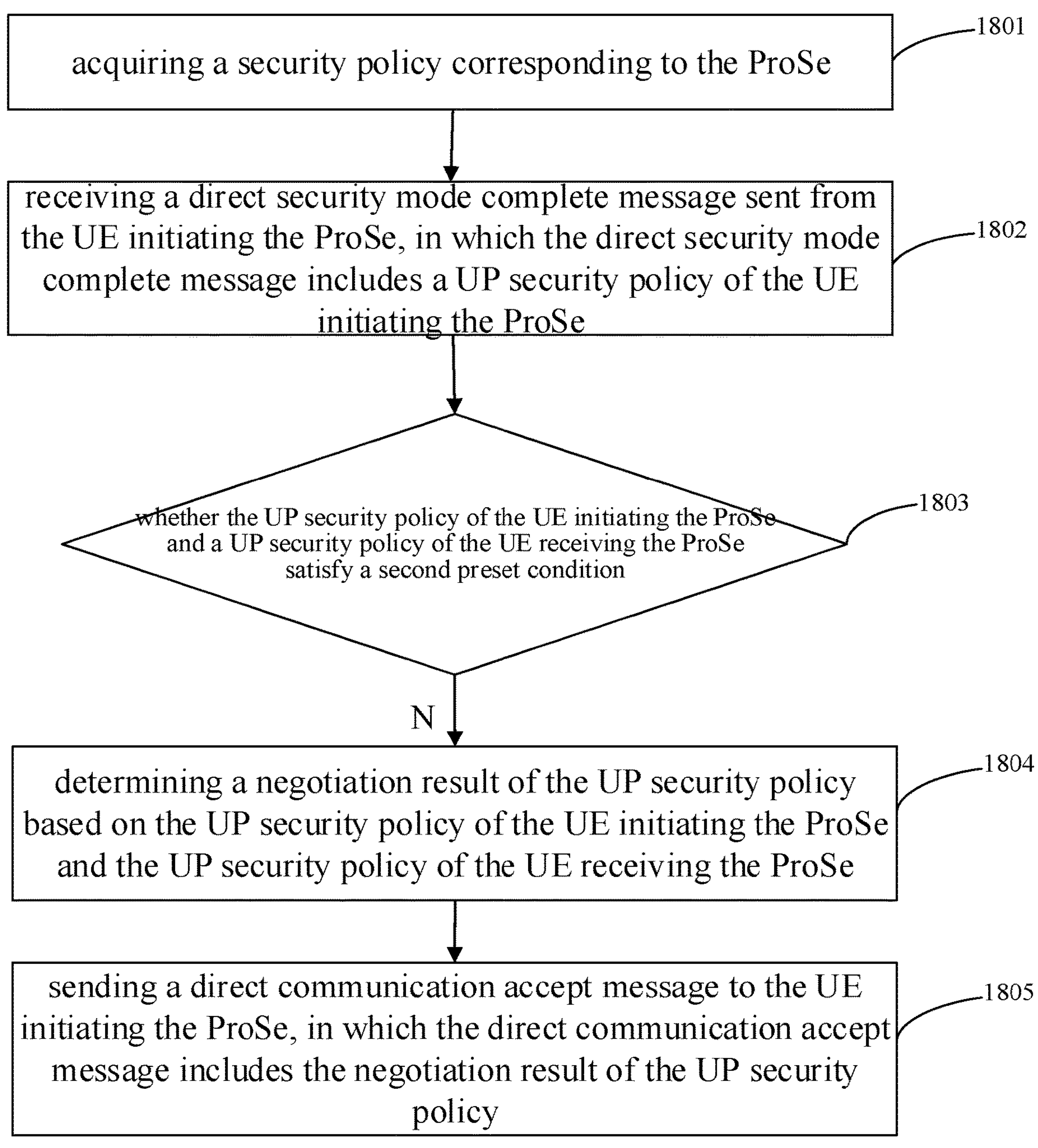
FIG. 18 is a flowchart illustrating a method for direct communication performed by a UE initiating a ProSe according to another embodiment of the present disclosure.

FIG. 18 is a flowchart illustrating a method for direct communication according to another embodiment of the present disclosure. As illustrated in FIG. 18, the method for direct communication is performed by a UE receiving a ProSe, and may include following steps.

At step 1801, a security policy corresponding to the ProSe is acquired.

At step 1802, a direct security mode complete message sent from the UE initiating the ProSe is received. The direct security mode complete message includes a UP security policy of the UE initiating the ProSe.

At step 1803, whether the UP security policy of the UE initiating the ProSe and a UP security policy of the UE receiving the ProSe satisfy a second predefined condition is determined, and if not, step 1804 is executed.

In an embodiment of the disclosure, when it is determined that the signaling security policy of the UE initiating the ProSe and the signaling security policy of the UE receiving the ProSe do not satisfy the second predefined condition, it indicates that there is no security policy conflict between the UE initiating the ProSe and the UE receiving the ProSe, and both are qualified for direct communication, and step 1804 continues to be executed.

At step 1804, a negotiation result of the UP security policy is determined based on the UP security policy of the UE initiating the ProSe and the UP security policy of the UE receiving the ProSe.

At step 1805, a direct communication accept message is sent to the UE initiating the ProSe. The direct communication accept message includes the negotiation result of the UP security policy.

The descriptions of steps 1801 to 1805 may to refer to related introduction of the above embodiments, which will not be repeated here.

In summary, in the method for direct communication provided in the embodiments of the disclosure, the UE receiving the ProSe can acquire the security policy corresponding to the ProSe, and establish direct communication security with the UE initiating the ProSe based on the acquired security policy. Therefore, in the embodiments of the disclosure, the security policy corresponding to the ProSe can be configured for the UE, so that the UE receiving the ProSe and the UE initiating the ProSe can establish direct communication security based on the security policy. Therefore, the direct communication security between the UEs in the ProSe is guaranteed, thereby improving security of information transmission.

Figures 19, 20:
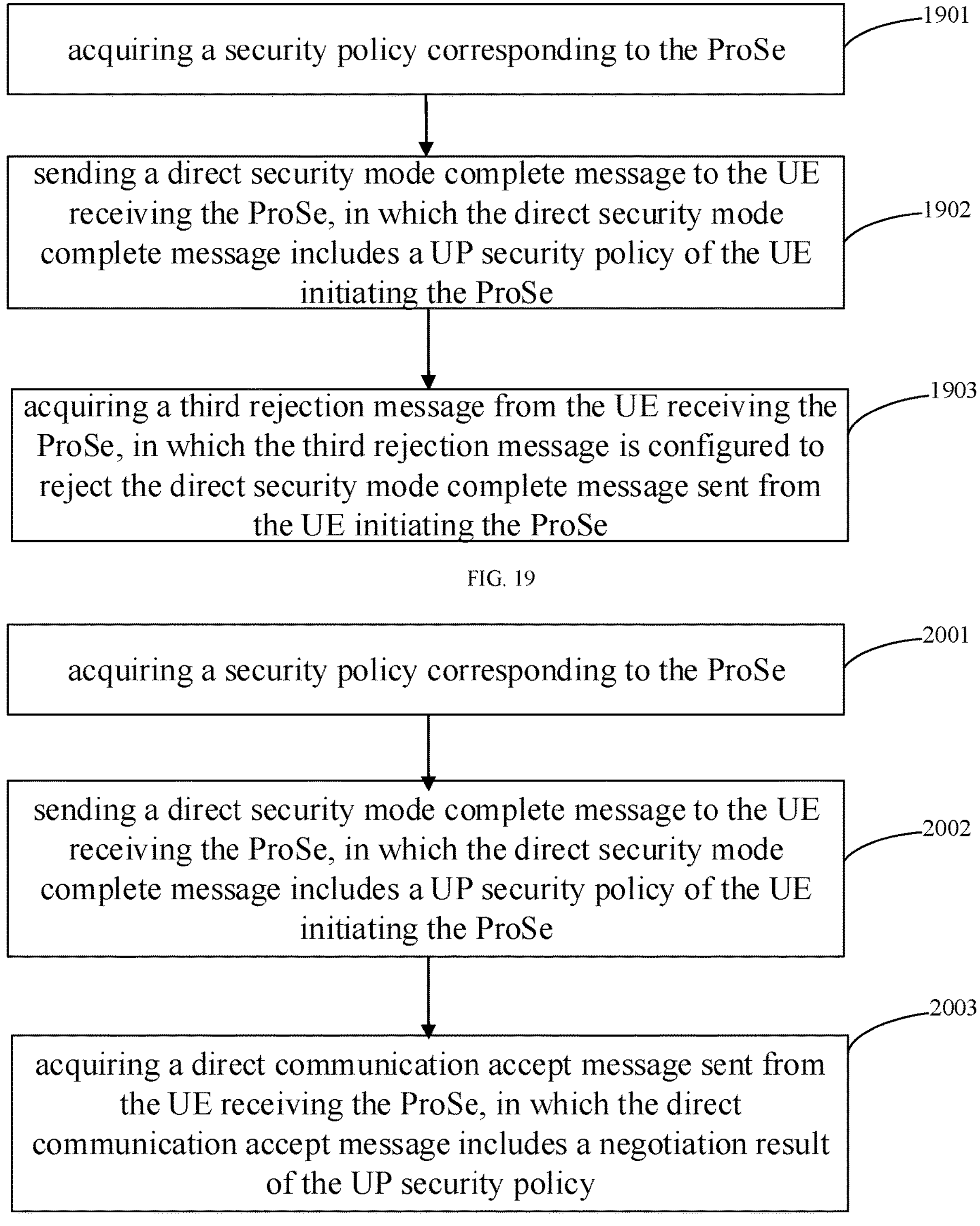
FIG. 19 is a flowchart illustrating a method for direct communication performed by a UE initiating a ProSe according to another embodiment of the present disclosure.
FIG. 20 is a flowchart illustrating a method for direct communication performed by a UE initiating a ProSe according to another embodiment of the present disclosure.

FIG. 19 is a flowchart illustrating a method for direct communication according to another embodiment of the present disclosure. As illustrated in FIG. 19, the method for direct communication is performed by a UE initiating a ProSe, and may include following steps.

At step 1901, a security policy corresponding to the ProSe is acquired.

At step 1902, a direct security mode complete message is sent to the UE receiving the ProSe. The direct security mode complete message includes a UP security policy of the UE initiating the ProSe.

At step 1903, a third rejection message sent from the UE receiving the ProSe is acquired. The third rejection message is configured to reject the direct security mode complete message sent from the UE initiating the ProSe.

The descriptions of steps 1901 to 1903 may to refer to related introduction of the above embodiments, which will not be repeated here.

In summary, in the method for direct communication provided in the embodiments of the disclosure, the UE initiating the ProSe can acquire the security policy corresponding to the ProSe, and establish direct communication security with the UE receiving the ProSe based on the acquired security policy. Therefore, in the embodiments of the disclosure, the security policy corresponding to the ProSe can be configured for the UE, so that the UE receiving the ProSe and the UE initiating the ProSe can establish direct communication security based on the security policy. Therefore, the direct communication security between the UEs in the ProSe is guaranteed, thereby improving security of information transmission.

FIG. 20 is a flowchart illustrating a method for direct communication according to another embodiment of the present disclosure. As illustrated in FIG. 20, the method for direct communication is performed by a UE initiating a ProSe, and may include following steps.

At step 2001, a security policy corresponding to the ProSe is acquired.

At step 2002, a direct security mode complete message is sent to the UE receiving the ProSe. The direct security mode complete message includes a UP security policy of the UE initiating the ProSe.

At step 2003, a direct communication accept message sent from the UE receiving the ProSe is acquired. The direct communication accept message includes a negotiation result of the UP security policy.

The descriptions of steps 2001 to 2003 may to refer to related introduction of the above embodiments, which will not be repeated here.

In summary, in the method for direct communication provided in the embodiments of the disclosure, the UE initiating the ProSe can acquire the security policy corresponding to the ProSe, and establish direct communication security with the UE receiving the ProSe based on the acquired security policy. Therefore, in the embodiments of the disclosure, the security policy corresponding to the ProSe can be configured for the UE, so that the UE receiving the ProSe and the UE initiating the ProSe can establish direct communication security based on the security policy. Therefore, the direct communication security between the UEs in the ProSe is guaranteed, thereby improving security of information transmission.

Figures 21, 22:
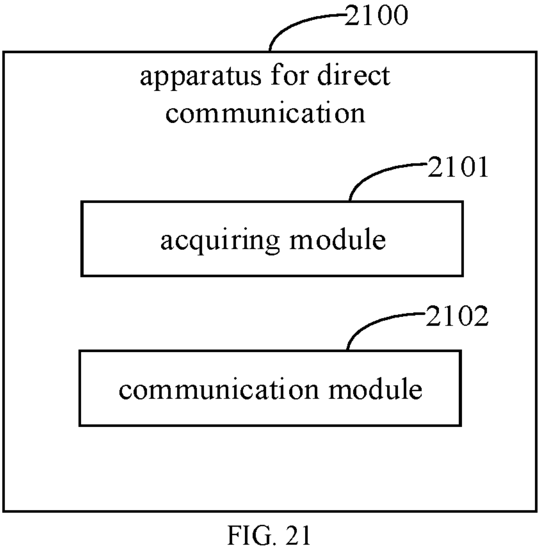
FIG. 21 is a block diagram of an apparatus for direct communication according to an embodiment of the present disclosure.
FIG. 22 is a block diagram of an apparatus for direct communication according to another embodiment of the present disclosure.

FIG. 21 is a diagram illustrating a structure of an apparatus for direct communication provided in an embodiment of the present disclosure. As illustrated in FIG. 21, the apparatus 2100 may include an acquiring module 2101 and a communication module 2102.

The acquiring module 2101 is configured to acquire a security policy corresponding to a proximity based service (ProSe).

The communication module 2102 is configured to establish direct communication security with a UE initiating the ProSe based on the security policy.

In summary, in the apparatus for the direct communication provided in the embodiments of the disclosure, the UE receiving the ProSe can acquire the security policy corresponding to the ProSe, and establish direct communication security with the UE initiating the ProSe based on the acquired security policy. Therefore, in the embodiments of the disclosure, the security policy corresponding to the ProSe can be configured for the UE, so that the UE receiving the ProSe and the UE initiating the ProSe can establish direct communication security based on the security policy. Therefore, the direct communication security between the UEs in the ProSe is guaranteed, thereby improving security of information transmission.

In an embodiment of the present disclosure, the security policy includes at least one of:

a signaling security policy; or a user plane (UP) security policy.

Further, in another embodiment of the present disclosure, the security policy includes at least one of:

a signaling integrity protection policy;

a signaling encryption protection policy;

a UP integrity protection policy; or a UP encryption protection policy.

Further, in another embodiment of the present disclosure, the security policy includes REQUIRED; NOT NEEDED; and PREFERRED.

Further, in another embodiment of the present disclosure, the acquiring module is further configured to:

acquire a REQUIRED ProSe sent from a policy control function (PCF) and a security policy corresponding to the REQUIRED ProSe.

Further, in another embodiment of the present disclosure, the acquiring module is further configured to:

acquire a REQUIRED ProSe sent from a ProSe application server and a security policy corresponding to the REQUIRED ProSe.

Further, in another embodiment of the present disclosure, the acquiring module is further configured to:

acquire a REQUIRED ProSe configured on a UICC and a security policy corresponding to the REQUIRED ProSe.

Further, in another embodiment of the present disclosure, the above communication module 2102 is further configured to:

acquire a direct communication request message sent from the UE initiating the ProSe, in which the direct communication request message includes a signaling security policy of the UE initiating the ProSe; and determine whether the signaling security policy of the UE initiating the ProSe and a signaling security policy of the UE receiving the ProSe satisfy a first predefined condition;

the first predefined condition includes at least one of:

a signaling integrity protection policy of the UE initiating the ProSe being NOT NEEDED, and a signaling integrity protection policy of the UE receiving the ProSe being REQUIRED;

a signaling encryption protection policy of the UE initiating the ProSe being NOT NEEDED, and a signaling encryption protection policy of the UE receiving the ProSe being REQUIRED;

a signaling integrity protection policy of the UE initiating the ProSe being REQUIRED, and a signaling integrity protection policy of the UE receiving the ProSe being NOT NEEDED; or a signaling encryption protection policy of the UE initiating the ProSe being REQUIRED, and a signaling encryption protection policy of the UE receiving the ProSe being NOT NEEDED;

when the signaling security policy of the UE initiating the ProSe and the signaling security policy of the UE receiving the ProSe satisfy the first predefined condition, sending a first rejection message to the UE initiating the ProSe. The first rejection message is configured to reject the direct communication request message sent from the UE initiating the ProSe.

Further, in another embodiment of the present disclosure, the above communication module 2102 is further configured to:

acquire a direct communication request message sent from the UE initiating the ProSe, in which the direct communication request message includes a signaling security policy of the UE initiating the ProSe; and determine whether the signaling security policy of the UE initiating the ProSe and a signaling security policy of the UE receiving the ProSe satisfy a first predefined condition;

the first predefined condition includes at least one of:

a signaling integrity protection policy of the UE initiating the ProSe being NOT NEEDED, and a signaling integrity protection policy of the UE receiving the ProSe being REQUIRED;

a signaling encryption protection policy of the UE initiating the ProSe being NOT NEEDED, and a signaling encryption protection policy of the UE receiving the ProSe being REQUIRED;

a signaling integrity protection policy of the UE initiating the ProSe being REQUIRED, and a signaling integrity protection policy of the UE receiving the ProSe being NOT NEEDED; or a signaling encryption protection policy of the UE initiating the ProSe being REQUIRED, and a signaling encryption protection policy of the UE receiving the ProSe being NOT NEEDED;

when the signaling security policy of the UE initiating the ProSe and the signaling security policy of the UE receiving the ProSe do not satisfy the first predefined condition, determine a negotiation result of the signaling security policy based on the signaling security policy of the UE initiating the ProSe and the signaling security policy of the UE receiving the ProSe; and send a direct security mode command message to the UE initiating the ProSe. The direct security mode command message includes the negotiation result of the signaling security policy.

Further, in another embodiment of the present disclosure, the negotiation result of the signaling security policy includes at least one of:

a negotiation result of the signaling integrity protection policy; or a negotiation result of the signaling encryption protection policy.

Further, in an embodiment of the present disclosure, the communication module 2102 is further configured to:

when the signaling integrity protection policy of the UE initiating the ProSe is NOT NEEDED, and/or and the signaling integrity protection policy of the UE receiving the ProSe is NOT NEEDED, determine that the negotiation result of the signaling integrity protection policy is NOT NEEDED;

when the signaling integrity protection policy of the UE initiating the ProSe is REQUIRED, and/or the signaling integrity protection policy of the UE receiving the ProSe is REQUIRED, determine that the negotiation result of the signaling integrity protection policy is REQUIRED;

when the signaling integrity protection policy of the UE initiating the ProSe is PREFERRED, and the signaling integrity protection policy of the UE receiving the ProSe is PREFERRED, determine that the negotiation result of the signaling integrity protection policy is REQUIRED or NOT NEEDED;

when the signaling encryption protection policy of the UE initiating the ProSe is NOT NEEDED, and/or and the signaling encryption protection policy of the UE receiving the ProSe is NOT NEEDED, determine that the negotiation result of the signaling encryption protection policy is NOT NEEDED;

when the signaling encryption protection policy of the UE initiating the ProSe is REQUIRED, and/or the signaling encryption protection policy of the UE receiving the ProSe is REQUIRED, determine that the negotiation result of the signaling encryption protection policy is REQUIRED; and when the signaling encryption protection policy of the UE initiating the ProSe is PREFERRED, and the signaling encryption protection policy of the UE receiving the ProSe is PREFERRED, determine that the negotiation result of the signaling encryption protection policy is REQUIRED or NOT NEEDED.

Further, in another embodiment of the present disclosure, the above apparatus is further configured to:

receive a second rejection message sent from the UE initiating the ProSe. The second rejection message is configured to reject the direct security mode command message sent from the UE receiving the ProSe.

Further, in another embodiment of the present disclosure, the above apparatus is further configured to:

when the negotiation result of the signaling encryption protection policy is NOT NEEDED, change a UP encryption protection policy of the UE receiving the ProSe to NOT NEEDED.

Further, in another embodiment of the present disclosure, the above apparatus is further configured to:

receive a direct security mode complete message sent from the UE initiating the ProSe, in which the direct security mode complete message includes a UP security policy of the UE initiating the ProSe; and determine whether the UP security policy of the UE initiating the ProSe and a UP security policy of the UE receiving the ProSe satisfy a second predefined condition;

the second predefined condition includes at least one of:

a UP integrity protection policy of the UE initiating the ProSe being NOT NEEDED, and the UP integrity protection policy of the UE receiving the ProSe being REQUIRED;

a UP encryption protection policy of the UE initiating the ProSe being NOT NEEDED, and the UP encryption protection policy of the UE receiving the ProSe being REQUIRED;

a UP integrity protection policy of the UE initiating the ProSe being REQUIRED, and the UP integrity protection policy of the UE receiving the ProSe being NOT NEEDED; or a UP encryption protection policy of the UE initiating the ProSe being REQUIRED, and the UP encryption protection policy of the UE receiving the ProSe being NOT NEEDED;

when the UP security policy of the UE initiating the ProSe and the UP security policy of the UE receiving the ProSe satisfy the second predefined condition, send a third rejection message to the UE initiating the ProSe. The third rejection message is configured to reject the direct security mode complete message sent from the UE initiating the ProSe.

Further, in another embodiment of the present disclosure, the above apparatus is further configured to:

receive a direct security mode complete message sent from the UE initiating the ProSe, in which the direct security mode complete message includes a UP security policy of the UE initiating the ProSe; and determine whether the UP security policy of the UE initiating the ProSe and a UP security policy of the UE receiving the ProSe satisfy a second predefined condition;

the second predefined condition includes at least one of:

a UP integrity protection policy of the UE initiating the ProSe being NOT NEEDED, and the UP integrity protection policy of the UE receiving the ProSe being REQUIRED;

a UP encryption protection policy of the UE initiating the ProSe being NOT NEEDED, and the UP encryption protection policy of the UE receiving the ProSe being REQUIRED;

a UP integrity protection policy of the UE initiating the ProSe being REQUIRED, and the UP integrity protection policy of the UE receiving the ProSe being NOT NEEDED; or a UP encryption protection policy of the UE initiating the ProSe being REQUIRED, and the UP encryption protection policy of the UE receiving the ProSe being NOT NEEDED;

when the UP security policy of the UE initiating the ProSe and the UP security policy of the UE receiving the ProSe do not satisfy the second predefined condition, determine a negotiation result of the UP security policy based on the UP security policy of the UE initiating the ProSe and the UP security policy of the UE receiving the ProSe; and send a direct communication accept message to the UE initiating the ProSe. The direct communication accept message includes the negotiation result of the UP security policy.

Further, in another embodiment of the present disclosure, the negotiation result of the UP security policy includes at least one of: a negotiation result of the UP integrity protection policy; or a negotiation result of the UP encryption protection policy.

Further, in another embodiment of the present disclosure, the above apparatus is further configured to:

when the UP integrity protection policy of the UE initiating the ProSe is NOT NEEDED, and/or the UP integrity protection policy of the UE receiving the ProSe is NOT NEEDED, determine that the negotiation result of the UP integrity protection policy is NOT NEEDED;

when the UP integrity protection policy of the UE initiating the ProSe is REQUIRED, and/or UP integrity protection policy of the UE receiving the ProSe is REQUIRED, determine that the negotiation result of the UP integrity protection policy is REQUIRED;

when the UP integrity protection policy of the UE initiating the ProSe is PREFERRED, and the UP integrity protection policy of the UE receiving the ProSe is PREFERRED, determine that the negotiation result of the UP integrity protection policy is REQUIRED or NOT NEEDED;

when the UP encryption protection policy of the UE initiating the ProSe is NOT NEEDED, and/or the UP encryption protection policy of the UE receiving the ProSe is NOT NEEDED, determine that the negotiation result of the UP encryption protection policy is NOT NEEDED;

when the UP encryption protection policy of the UE initiating the ProSe is REQUIRED, and/or the UP encryption protection policy of the UE receiving the ProSe is REQUIRED, determine that the negotiation result of the UP encryption protection policy is REQUIRED; and when the UP encryption protection policy of the UE initiating the ProSe is PREFERRED, and the UP encryption protection policy of the UE receiving the ProSe is PREFERRED, determine that the negotiation result of the UP encryption protection policy is REQUIRED or NOT NEEDED.

Further, in another embodiment of the present disclosure, the above apparatus is further configured to:

perform direct communication with the UE initiating the ProSe based on the negotiation result of the signaling security policy and the negotiation result of the UP security policy.

FIG. 22 is a diagram illustrating a structure of an apparatus for direct communication provided in another embodiment of the present disclosure. As illustrated in FIG. 22, the apparatus 2200 may include an acquiring module 2101 and a communication module 2102.

The acquiring module 2201 is configured to acquire a security policy corresponding to a proximity based service (ProSe).

The communication module 2202 is configured to establish direct communication security with a UE receiving the ProSe based on the security policy.

In summary, in the apparatus for the direct communication provided in the embodiments of the disclosure, the UE receiving the ProSe can acquire the security policy corresponding to the ProSe, and establish direct communication security with the UE initiating the ProSe based on the acquired security policy. Therefore, in the embodiments of the disclosure, the security policy corresponding to the ProSe can be configured for the UE, so that the UE receiving the ProSe and the UE initiating the ProSe can establish direct communication security based on the security policy. Therefore, the direct communication security between the UEs in the ProSe is guaranteed, thereby improving security of information transmission.

In an embodiment of the present disclosure, the security policy includes at least one of:

a signaling security policy; or a user plane (UP) security policy.

Further, in another embodiment of the present disclosure, the security policy includes at least one of:

a signaling integrity protection policy;

a signaling encryption protection policy;

a UP integrity protection policy; or a UP encryption protection policy.

Further, in another embodiment of the present disclosure, the security policy includes REQUIRED; NOT NEEDED; and PREFERRED.

Further, in another embodiment of the present disclosure, the acquiring module is further configured to:

acquire a REQUIRED ProSe sent from a policy control function (PCF) and a security policy corresponding to the REQUIRED ProSe.

Further, in another embodiment of the present disclosure, the acquiring module is further configured to:

acquire a REQUIRED ProSe sent from a ProSe application server and a security policy corresponding to the REQUIRED ProSe.

Further, in another embodiment of the present disclosure, the acquiring module is further configured to:

acquire a REQUIRED ProSe configured on a UICC and a security policy corresponding to the REQUIRED ProSe.

Further, in another embodiment of the present disclosure, the above communication module 2202 is further configured to:

send a direct communication request message sent from the UE receiving the ProSe, in which the direct communication request message includes a signaling security policy of the UE initiating the ProSe; and acquire a first rejection message sent from the UE receiving the ProSe, in which the first rejection message is configured to reject a direct communication request message sent from the UE initiating the ProSe.

Further, in another embodiment of the present disclosure, the above communication module 2202 is further configured to:

send a direct communication request message to the UE receiving the ProSe, in which the direct communication request message includes a signaling security policy of the UE initiating the ProSe; and acquire a direct security mode command message sent from the UE receiving the ProSe, in which the direct security mode command message includes a negotiation result of the signaling security policy.

Further, in another embodiment of the present disclosure, the above communication module 2202 is further configured to:

determine whether a security algorithm corresponding to the signaling security policy of the UE receiving the ProSe is consistent with a security algorithm corresponding to the signaling security policy of the UE initiating the ProSe; and when the security algorithm corresponding to the signaling security policy of the UE receiving the ProSe is inconsistent with the security algorithm corresponding to the signaling security policy of the UE initiating the ProSe, send a second rejection message to the UE receiving the ProSe. The second rejection message is configured to reject a direct security mode command message sent from the UE receiving the ProSe.

Further, in another embodiment of the present disclosure, the negotiation result of the signaling security policy includes at least one of:

a negotiation result of the signaling integrity protection policy; or a negotiation result of the signaling encryption protection policy.

Further, in another embodiment of the present disclosure, the above apparatus is further configured to:

when the negotiation result of the signaling encryption protection policy is NOT NEEDED, change a UP encryption protection policy of the UE initiating the ProSe to NOT NEEDED.

Further, in another embodiment of the present disclosure, the above apparatus is further configured to:

send a direct security mode complete message to the UE receiving the ProSe, in which the direct security mode complete message includes a UP security policy of the UE initiating the ProSe; and acquire a third rejection message sent from the UE receiving the ProSe. The third rejection message is configured to reject the direct security mode complete message sent from the UE initiating the ProSe.

Further, in another embodiment of the present disclosure, the above apparatus is further configured to:

send a direct security mode complete message to the UE receiving the ProSe, in which the direct security mode complete message includes a UP security policy of the UE initiating the ProSe; and acquire a direct communication accept message sent from the UE receiving the ProSe, in which the direct communication accept message includes a negotiation result of the UP security policy.

Further, in another embodiment of the present disclosure, the above apparatus is further configured to:

perform direct communication with the ProSe UE based on the negotiation result of the signaling security policy and the negotiation result of the UP security policy.

The computer storage medium provided in embodiments of the present disclosure is stored with an executable program. When the executable program is executed by a processor, the method as illustrated in any one of FIGS. 1 to 8, FIGS. 17 to 18 or FIGS. 9 to 16 or FIGS. 19 to 20 is implemented.

In order to implement the above embodiments, a computer program product including a computer program is further provided in the disclosure. When the computer program is executed by a processor, the method as illustrated in any one of FIGS. 1 to 8, FIGS. 17 to 18 or FIGS. 9 to 16 or FIGS. 19 to 20 is implemented.

In addition, in order to implement the above embodiments, a computer program is further provided in the disclosure. When the program is executed by a processor, the method as illustrated in any one of FIGS. 1 to 8, FIGS. 17 to 18 or FIGS. 9 to 16 or FIGS. 19 to 20 is implemented.

Figure 23:
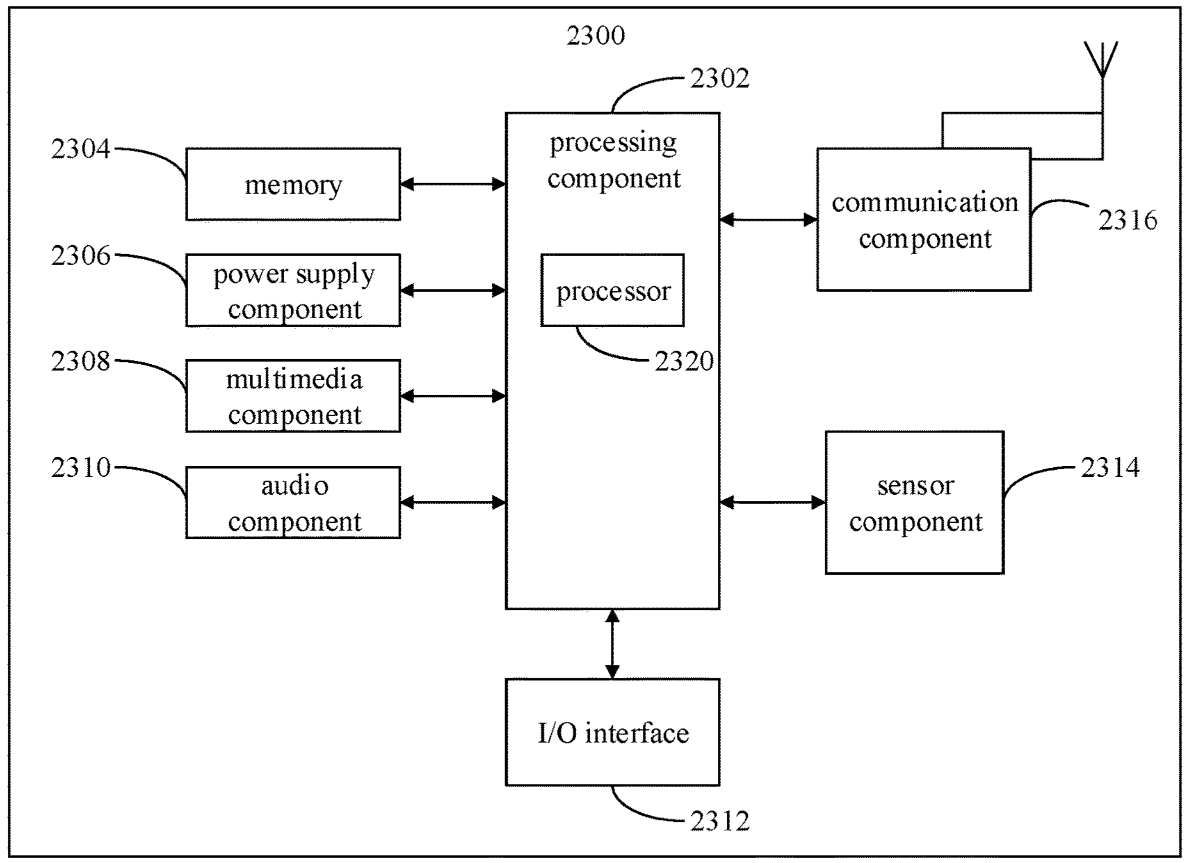
FIG. 23 is a block diagram of a user equipment (UE) according to an embodiment of the present disclosure.

FIG. 23 is a block diagram illustrating a user equipment (UE) 2300 according to an embodiment of the present disclosure. For example, the UE 2300 may be a mobile phone, a computer, a digital broadcasting terminal equipment, a messaging device, a game console, a tablet device, a medical equipment, a fitness equipment, a personal digital assistant, etc.

As illustrated in FIG. 23, the UE 2300 may include at least one component: a processing component 2302, a memory 2304, an power supply component 2306, a multimedia component 2308, an audio component 2310, an input/output (I/O) of interface 2312, a sensor component 2313, and a communication component 2316.

The processing component 2302 generally controls the whole operation of the UE 2300, such as operations related to display, phone call, data communication, camera operation and recording operation. The processing component 2302 may include one or more processors 2320 to perform instructions, to complete all or part of steps of the above method. In addition, the processing component 2302 may include at least one module for the convenience of interaction between the processing component 2302 and other components. For example, the processing units 2302 may include the multimedia module for the convenience of interaction between the multimedia units 2308 and the processing units 2302.

The memory 2304 is configured to store all types of data to support an operation of the UE 2300. Examples of the data include the instructions of any applications or methods operated on the UE 2300, contact data, phone book data, messages, pictures, videos, etc. The memory 2304 may be implemented by any type of volatile or non-volatile storage devices or their combination, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power supply component 2306 may provide power supply for all components of the UE 2300. The power supply component 2306 may include a power supply management system, at least one power supply, and other components related to generating, managing and distributing power for the UE 2300.

The multimedia component 2308 includes a screen of an output interface provided between the UE 2300 and the user. In some embodiments, a screen may include a liquid crystal display (LCD) and a touch panel (TP). When the screen includes a touch panel, the screen may be implemented as a touch screen to receive input signals from the user. The touch panel includes at least one touch sensor to sense touching, sliding and gestures on the touch panel. The touch sensor may not only sense the boundary of touch or slide action, but also detect wakeup time and pressure related to the touching or sliding operation. In some embodiments, the multimedia component 2308 includes a front camera and/or a rear camera. When the UE 2300 is in operation mode, such as shooting mode or video mode, the front camera or the rear camera may receive external multimedia data. Every front camera and rear camera may be a fixed optical lens system or an optical lens system with focal length and optical zoom capacity.

The audio component 2310 is configured as an output and/or input signal. For example, the audio component 2310 includes a microphone (MIC). When the UE 2300 is in operation mode, such as call mode, record mode, and speech recognition mode, a microphone is configured to receive external audio signals. The audio signals received may be further stored in the memory 2304 or sent via the communication units 2316. In some embodiments, the audio component 2310 further includes a speaker configured to output an audio signal.

The I/O interface 2312 provides an interface for the processing component 2302 and the peripheral interface module, and the peripheral interface module may be a keyboard, a click wheel, a button, etc. The buttons may include but not limited to a home button, a volume button, a start button and a lock button.

The sensor component 2313 includes at least one sensor configured to provide status assessments in all aspects for the UE 2300. For example, the sensor component 2313 may detect an on/off state of the UE 2300 and relative positioning of the component. For example, the component is a display and a keypad of the UE 2300. The sensor component 2313 may further detect a location change of the UE 2300 or one component of the UE 2300, presence or absence of contact between the user and the UE 2300, an orientation or acceleration/deceleration of the UE 2300, and a temperature change of the UE 2300. The sensor component 2313 may include a proximity sensor, which is configured to detect the existence of the objects nearby without any physical contact. The sensor component 2313 may further include a light sensor such as a CMOS or CCD image sensor, which is configured to use in imaging applications. In some embodiments, the sensor units 2313 may further include an acceleration transducer, a gyroscope sensor, a magnetic sensor, a pressure sensor or a temperature sensor.

The communication component 2316 may be configured for the convenience of wired or wireless communication between the UE 2300 and other devices. The UE 2300 may access wireless networks based on a communication standard, such as WiFi, 2G or 3G, or their combination. In an embodiment, the communication component 2316 receives broadcast signals or broadcast-related information from an external broadcast management system via a broadcast channel. In an embodiment, the communication units 2316 further includes a near field communication (NFC) module to facilitate short-range communication. For example, an NFC module may be implemented based on a radio frequency identification (RFID) technology, an infrared data association (IRDA) technology, an ultra-wideband (UWB) technology, bluetooth (BT) technology and other technologies.

In an example embodiment, the UE 2300 may be implemented by at least one application specific integrated circuit (ASIC), digital signal processor (DSP), digital signal processing device (DSPD), programmable logic device (PLD), field programmable gate array (FPGA), controller, microcontroller, microprocessor or other electronics components, which is configured to perform the above method.

After considering the specification and practicing the disclosure herein, those skilled in the art will easily think of other implementations. The present disclosure is intended to cover any variations, usages, or adaptive changes of the present disclosure. These variations, usages, or adaptive changes follow the general principles of the present disclosure and include common knowledge or conventional technical means in the technical field not disclosed by the present disclosure. The description and the embodiments are to be regarded as exemplary only, and the true scope and spirit of embodiments in the present disclosure are given by the appended claims.

It should be understood that the present disclosure is not limited to the precise structure described above and shown in the drawings, and various modifications and changes may be made without departing from its scope. The scope of the present application is only limited by the appended claims. The scope of the present disclosure is only limited by the appended claims.

What is claimed is:

1. A method for direct communication, performed by a user equipment (UE) receiving a proximity based service (ProSe), comprising:

acquiring a security policy corresponding to the ProSe; and establishing direct communication security with a UE initiating the ProSe based on the security policy, wherein the security policy comprises a signaling security policy; a signaling integrity protection policy; REQUIRED; NOT NEEDED; and PREFERRED, wherein establishing the direct communication security with the UE initiating the ProSe based on the security policy comprises:

acquiring a direct communication request message sent from the UE initiating the ProSe, wherein the direct communication request message comprises a signaling security policy of the UE initiating the ProSe; and determining whether the signaling security policy of the UE initiating the ProSe and a signaling security policy of the UE receiving the ProSe satisfy a first predefined condition;

wherein the first predefined condition comprises at least one of:

a signaling integrity protection policy of the UE initiating the ProSe being NOT NEEDED, and a signaling integrity protection policy of the UE receiving the ProSe being REQUIRED; or a signaling integrity protection policy of the UE initiating the ProSe being REQUIRED, and a signaling integrity protection policy of the UE receiving the ProSe being NOT NEEDED, when the signaling security policy of the UE initiating the ProSe and the signaling security policy of the UE receiving the ProSe do not satisfy the first predefined condition, determining a negotiation result of the signaling security policy based on the signaling security policy of the UE initiating the ProSe and the signaling security policy of the UE receiving the ProSe; and sending a direct security mode command message to the UE initiating the ProSe, wherein the direct security mode command message comprises the negotiation result of the signaling security policy.

2. The method according to claim 1, wherein the security policy further comprises:

a user plane (UP) security policy;

a signaling encryption protection policy;

a UP integrity protection policy;

a UP encryption protection policy.

3. The method according to claim 2, wherein acquiring the security policy corresponding to the ProSe comprises:

acquiring a REQUIRED ProSe sent from a policy control function (PCF) and a security policy corresponding to the REQUIRED ProSe, or acquiring a REQUIRED ProSe sent from a ProSe application server and a security policy corresponding to the REQUIRED ProSe, or acquiring a REQUIRED ProSe configured on a universal integrated circuit card (UICC) and a security policy corresponding to the REQUIRED ProSe.

4. The method according to claim 2, wherein the first predefined condition further comprises at least one of:

a signaling encryption protection policy of the UE initiating the ProSe being NOT NEEDED, and a signaling encryption protection policy of the UE receiving the ProSe being REQUIRED; or a signaling encryption protection policy of the UE initiating the ProSe being REQUIRED, and a signaling encryption protection policy of the UE receiving the ProSe being NOT NEEDED;

wherein establishing the direct communication security with the UE initiating the ProSe based on the security policy further comprises:

when the signaling security policy of the UE initiating the ProSe and the signaling security policy of the UE receiving the ProSe satisfy the first predefined condition, sending a first rejection message to the UE initiating the ProSe, wherein the first rejection message is configured to reject the direct communication request message sent from the UE initiating the ProSe.

5. The method according to claim 4, wherein the negotiation result of the signaling security policy comprises at least one of: a negotiation result of the signaling integrity protection policy; or a negotiation result of the signaling encryption protection policy;

the determining the negotiation result of the signaling security policy based on the signaling security policy of the UE initiating the ProSe and the signaling security policy of the UE receiving the ProSe, comprises:

when at least one of the signaling integrity protection policy of the UE initiating the ProSe or the signaling integrity protection policy of the UE receiving the ProSe is NOT NEEDED, determining that the negotiation result of the signaling integrity protection policy is NOT NEEDED;

when at least one of the signaling integrity protection policy of the UE initiating the ProSe or the signaling integrity protection policy of the UE receiving the ProSe is REQUIRED, determining that the negotiation result of the signaling integrity protection policy is REQUIRED;

when the signaling integrity protection policy of the UE initiating the ProSe is PREFERRED, and the signaling integrity protection policy of the UE receiving the ProSe result is PREFERRED, determining that the negotiation result of the signaling integrity protection policy is REQUIRED or NOT NEEDED;

when at least one of the signaling encryption protection policy of the UE initiating the ProSe or the signaling encryption protection policy of the UE receiving the ProSe is NOT NEEDED, determining that the negotiation result of the signaling encryption protection policy is NOT NEEDED;

when at least one of the signaling encryption protection policy of the UE initiating the ProSe or the signaling encryption protection policy of the UE receiving the ProSe is REQUIRED, determining that the negotiation result of the signaling encryption protection policy is REQUIRED; and when the signaling encryption protection policy of the UE initiating the ProSe is PREFERRED, and the signaling encryption protection policy of the UE receiving the ProSe is PREFERRED, determining that the negotiation result of the signaling encryption protection policy is REQUIRED or NOT NEEDED.

6. The method according to claim 5, further comprising:

when the negotiation result of the signaling integrity protection policy is NOT NEEDED, changing a UP integrity protection policy of the UE receiving the ProSe to NOT NEEDED; and when the negotiation result of the signaling encryption protection policy is NOT NEEDED, changing a UP encryption protection policy of the UE receiving the ProSe to NOT NEEDED.

7. The method according to claim 6, further comprising:

receiving a direct security mode complete message sent from the UE initiating the ProSe, wherein the direct security mode complete message comprises a UP security policy of the UE initiating the ProSe; and determining whether the UP security policy of the UE initiating the ProSe and a UP security policy of the UE receiving the ProSe satisfy a second predefined condition;

wherein the second predefined condition comprises at least one of:

a UP integrity protection policy of the UE initiating the ProSe being NOT NEEDED, and the UP integrity protection policy of the UE receiving the ProSe being REQUIRED;

a UP encryption protection policy of the UE initiating the ProSe being NOT NEEDED, and the UP encryption protection policy of the UE receiving the ProSe being REQUIRED;

a UP integrity protection policy of the UE initiating the ProSe being REQUIRED, and the UP integrity protection policy of the UE receiving the ProSe being NOT NEEDED; or a UP encryption protection policy of the UE initiating the ProSe being REQUIRED, and the UP encryption protection policy of the UE receiving the ProSe being NOT NEEDED;

when the UP security policy of the UE initiating the ProSe and the UP security policy of the UE receiving the ProSe satisfy the second predefined condition, sending a third rejection message to the UE initiating the ProSe, wherein the third rejection message is configured to reject the direct security mode complete message sent from the UE initiating the ProSe, when the UP security policy of the UE initiating the ProSe and the UP security policy of the UE receiving the ProSe do not satisfy the second predefined condition, determining a negotiation result of the UP security policy based on the UP security policy of the UE initiating the ProSe and the UP security policy of the UE receiving the ProSe; and sending a direct communication accept message to the UE initiating the ProSe, wherein the direct communication accept message comprises the negotiation result of the UP security policy.

8. The method according to claim 7, wherein the negotiation result of the UP security policy comprises at least one of: a negotiation result of the UP integrity protection policy; or a negotiation result of the UP encryption protection policy;

determining the negotiation result of the UP security policy based on the UP security policy of the UE initiating the ProSe and the UP security policy of the UE receiving the ProSe comprises:

when at least one of the UP integrity protection policy of the UE initiating the ProSe or the UP integrity protection policy of the UE receiving the ProSe is NOT NEEDED, determining that the negotiation result of the UP integrity protection policy is NOT NEEDED;

when at least one of the UP integrity protection policy of the UE initiating the ProSe or the UP integrity protection policy of the UE receiving the ProSe is REQUIRED, determining that the negotiation result of the UP integrity protection policy is REQUIRED;

when the UP integrity protection policy of the UE initiating the ProSe is PREFERRED, and the UP integrity protection policy of the UE receiving the ProSe is PREFERRED, determining that the negotiation result of the UP integrity protection policy is REQUIRED or NOT NEEDED;

when at least one of the UP encryption protection policy of the UE initiating the ProSe or the UP encryption protection policy of the UE receiving the ProSe is NOT NEEDED, determining that the negotiation result of the UP encryption protection policy is NOT NEEDED;

when at least one of the UP encryption protection policy of the UE initiating the ProSe or the UP encryption protection policy of the UE receiving the ProSe is REQUIRED, determining that the negotiation result of the UP encryption protection policy is REQUIRED; and when the UP encryption protection policy of the UE initiating the ProSe is PREFERRED, and the UP encryption protection policy of the UE receiving the ProSe is PREFERRED, determining that the negotiation result of the UP encryption protection policy is REQUIRED or NOT NEEDED.

9. The method according to claim 7, further comprising:

performing direct communication protection with the UE initiating the ProSe based on the negotiation result of the signaling security policy and the negotiation result of the UP security policy.

10. The method according to claim 4, further comprising:

receiving a second rejection message sent from the UE initiating the ProSe in response to determining by the UE initiating the ProSe that a security algorithm corresponding to the negotiation result of the signaling security policy comprised in the direct security mode command message is inconsistent with a security algorithm corresponding to the signaling security policy of the UE initiating the ProSe, wherein the second rejection message is configured to reject the direct security mode command message sent from the UE receiving the ProSe.

11. A method for direct communication, performed by a user equipment (UE) initiating a proximity based service (ProSe), comprising:

acquiring a security policy corresponding to the ProSe; and establishing direct communication security with a UE receiving the ProSe based on the security policy, wherein the security policy comprises a signaling security policy; a signaling integrity protection policy; REQUIRED; NOT NEEDED; and PREFERRED, wherein establishing the direct communication security with the UE receiving the ProSe based on the security policy comprises:

sending a direct communication request message to the UE receiving the ProSe, wherein the direct communication request message comprises a signaling security policy of the UE initiating the ProSe, wherein the signaling security policy of the UE initiating the ProSe is used by the UE receiving the ProSe for determining whether the signaling security policy of the UE initiating the ProSe and a signaling security policy of the UE receiving the ProSe satisfy a first predefined condition, wherein the first predefined condition comprises at least one of:

a signaling integrity protection policy of the UE initiating the ProSe being NOT NEEDED, and a signaling integrity protection policy of the UE receiving the ProSe being REQUIRED; or a signaling integrity protection policy of the UE initiating the ProSe being REQUIRED, and a signaling integrity protection policy of the UE receiving the ProSe being NOT NEEDED, when the signaling security policy of the UE initiating the ProSe and the signaling security policy of the UE receiving the ProSe do not satisfy the first predefined condition, acquiring a direct security mode command message sent from the UE receiving the ProSe, wherein the direct security mode command message comprises a negotiation result of the signaling security policy.

12. The method according to claim 11, wherein the security policy further comprises at least one of:

a user plane (UP) security policy;

a signaling encryption protection policy;

a UP integrity protection policy;

a UP encryption protection policy.

13. The method according to claim 12, wherein acquiring the security policy corresponding to the ProSe comprises:

acquiring a REQUIRED ProSe sent from a policy control function (PCF) and a security policy corresponding to the REQUIRED ProSe, or acquiring a REQUIRED ProSe sent from a ProSe application server and a security policy corresponding to the REQUIRED ProSe, or acquiring a REQUIRED ProSe configured on a universal integrated circuit card (UICC) and a security policy corresponding to the REQUIRED ProSe.

14. The method according to claim 12, wherein the first predefined condition further comprises at least one of:

a signaling encryption protection policy of the UE initiating the ProSe being NOT NEEDED, and a signaling encryption protection policy of the UE receiving the ProSe being REQUIRED; or a signaling encryption protection policy of the UE initiating the ProSe being REQUIRED, and a signaling encryption protection policy of the UE receiving the ProSe being NOT NEEDED, wherein establishing the direct communication security with the UE receiving the ProSe based on the security policy further comprises:

when the signaling security policy of the UE initiating the ProSe and the signaling security policy of the UE receiving the ProSe satisfy the first predefined condition, acquiring a first rejection message sent from the UE receiving the ProSe, wherein the first rejection message is configured to reject the direct communication request message sent from the UE initiating the ProSe.

15. The method according to claim 14, further comprising:

determining whether a security algorithm corresponding to the signaling security policy of the UE receiving the ProSe is consistent with a security algorithm corresponding to the signaling security policy of the UE initiating the ProSe, in response to acquiring the direct security mode command message sent from the UE receiving the ProSe; and when the security algorithm corresponding to the signaling security policy of the UE receiving the ProSe is inconsistent with the security algorithm corresponding to the signaling security policy of the UE initiating the ProSe, sending a second rejection message to the UE receiving the ProSe, wherein the second rejection message is configured to reject a direct security mode command message sent from the UE receiving the ProSe.

16. The method according to claim 14, wherein the negotiation result of the signaling security policy comprises at least one of: a negotiation result of the signaling integrity protection policy; or a negotiation result of the signaling encryption protection policy; and the method further includes:

when the negotiation result of the signaling integrity protection policy is NOT NEEDED, changing a UP integrity protection policy of the UE initiating the ProSe to NOT NEEDED; and when the negotiation result of the signaling encryption protection policy is NOT NEEDED, changing a UP encryption protection policy of the UE initiating the ProSe to NOT NEEDED.

17. The method according to claim 16, further comprising:

sending a direct security mode complete message to the UE receiving the ProSe, wherein the direct security mode complete message comprises a UP security policy of the UE initiating the ProSe; and acquiring a third rejection message sent from the UE receiving the ProSe, wherein the third rejection message is configured to reject the direct security mode complete message sent from the UE initiating the ProSe, or acquiring a direct communication accept message sent from the UE receiving the ProSe, wherein the direct communication accept message comprises a negotiation result of the UP security policy.

18. The method according to claim 17, further comprising:

performing direct communication with the UE receiving the ProSe based on the negotiation result of the signaling security policy and the negotiation result of the UP security policy, in response to acquiring the direct communication accept message sent from the UE receiving the ProSe.

19. A user equipment (UE) initiating a proximity based service (ProSe), comprising:

a processor; and a memory storing instructions executable by the processor, wherein the processor is configured to implement the method for direct communication according to claim 11.

20. A user equipment (UE) receiving a proximity based service (ProSe), comprising:

a processor; and a memory storing instructions executable by the processor, wherein the processor is configured to:

acquire a security policy corresponding to the ProSe; and establish direct communication security with a UE initiating the ProSe based on the security policy, wherein the security policy comprises a signaling security policy, wherein the security policy comprises a signaling integrity protection policy; REQUIRED; NOT NEEDED; and PREFERRED, wherein the processor is further configured to:

acquire a direct communication request message sent from the UE initiating the ProSe, wherein the direct communication request message comprises a signaling security policy of the UE initiating the ProSe; and determine whether the signaling security policy of the UE initiating the ProSe and a signaling security policy of the UE receiving the ProSe satisfy a first predefined condition;

wherein the first predefined condition comprises at least one of:

a signaling integrity protection policy of the UE initiating the ProSe being NOT NEEDED, and a signaling integrity protection policy of the UE receiving the ProSe being REQUIRED; or a signaling integrity protection policy of the UE initiating the ProSe being REQUIRED, and a signaling integrity protection policy of the UE receiving the ProSe being NOT NEEDED, when the signaling security policy of the UE initiating the ProSe and the signaling security policy of the UE receiving the ProSe do not satisfy the first predefined condition, determine a negotiation result of the signaling security policy based on the signaling security policy of the UE initiating the ProSe and the signaling security policy of the UE receiving the ProSe; and send a direct security mode command message to the UE initiating the ProSe, wherein the direct security mode command message comprises the negotiation result of the signaling security policy.

* * * * *